US008221223B2

(12) United States Patent
Walker et al.

(10) Patent No.: US 8,221,223 B2
(45) Date of Patent: Jul. 17, 2012

(54) METHODS, SYSTEMS AND APPARATUS FOR FACILITATING CASHOUT OPTIONS AT A GAMING DEVICE

(75) Inventors: Jay S. Walker, Ridgefield, CT (US); James A. Jorasch, New York, NY (US); Robert C. Tedesco, Fairfield, CT (US); Stephen C. Tulley, Monroe, CT (US); Gregory M. Gelman, Brooklyn, NY (US); Daniel E. Tedesco, Huntington, CT (US)

(73) Assignee: IGT, Reno, NV (US)

( * ) Notice: Subject to any disclaimer, the term of this patent is extended or adjusted under 35 U.S.C. 154(b) by 1375 days.

(21) Appl. No.: 11/465,471

(22) Filed: Aug. 18, 2006

(65) Prior Publication Data

US 2007/0129136 A1 Jun. 7, 2007

Related U.S. Application Data

(63) Continuation of application No. PCT/US2005/011747, filed on Apr. 7, 2005.

(60) Provisional application No. 60/560,314, filed on Apr. 7, 2004, provisional application No. 60/581,085, filed on Jun. 18, 2004.

(51) Int. Cl.
*A63F 9/24* (2006.01)
*A63F 13/00* (2006.01)
*G06F 17/00* (2006.01)
*G06F 19/00* (2006.01)

(52) U.S. Cl. .................. 463/25; 463/1; 463/16; 463/20; 463/29

(58) Field of Classification Search .................... 463/16, 463/20, 25, 1, 29
See application file for complete search history.

(56) References Cited

U.S. PATENT DOCUMENTS

| | | | |
|---|---|---|---|
| 4,492,378 | A | 1/1985 | Williams |
| 4,764,666 | A | 8/1988 | Bergeron |
| 4,815,741 | A | 3/1989 | Small |
| 4,837,728 | A | 6/1989 | Barrie et al. |
| 4,882,473 | A | 11/1989 | Bergeron et al. |
| 5,038,022 | A | 8/1991 | Lucero |

(Continued)

FOREIGN PATENT DOCUMENTS

| | | |
|---|---|---|
| GB | 2096376 | 10/1982 |

(Continued)

OTHER PUBLICATIONS

Website: "Position Statement—Request Prize Zone Machine", Colorado Department of Revenue, (http //www revenue state co us/liquor_dir/op6 htm), Nov. 21, 1997. 5 pgs.

(Continued)

*Primary Examiner* — Peter DungBa Vo
*Assistant Examiner* — Wei Li
(74) *Attorney, Agent, or Firm* — Neal, Gerber & Eisenberg LLP

(57) ABSTRACT

An embodiment of the invention includes receiving a request for a cashout of a balance from a player. In response to receiving the cashout request, at least one benefit to offer is determined based upon the balance. A value of the benefit is greater than the cashout amount.
An offer is provided to the player, which the player may accept in lieu of the cashout amount. In some embodiments, the player may accept the offer in lieu of a portion of the cashout amount or in addition to the cashout amount.

4 Claims, 20 Drawing Sheets

U.S. PATENT DOCUMENTS

| | | | | |
|---|---|---|---|---|
| 5,159,549 | A | 10/1992 | Hallman, Jr. et al. | |
| 5,332,076 | A | 7/1994 | Ziegert | |
| 5,342,047 | A | 8/1994 | Heidel et al. | |
| 5,371,345 | A | 12/1994 | LeStrange et al. | |
| 5,397,125 | A | 3/1995 | Adams | 273/138 A |
| 5,546,523 | A | 8/1996 | Gatto | |
| 5,575,717 | A | 11/1996 | Houriet, Jr. et al. | |
| 5,655,961 | A | 8/1997 | Acres et al. | 463/27 |
| 5,674,128 | A | 10/1997 | Holch et al. | 463/42 |
| 5,752,239 | A | 5/1998 | Coutts | |
| 5,766,074 | A | 6/1998 | Cannon et al. | |
| 5,779,546 | A | 7/1998 | Meissner et al. | |
| 5,816,918 | A | 10/1998 | Kelly et al. | |
| 5,951,397 | A | 9/1999 | Dickinson | |
| 5,984,779 | A | 11/1999 | Bridgeman et al. | |
| 5,993,316 | A | 11/1999 | Coyle et al. | |
| 6,012,832 | A | 1/2000 | Saunders et al. | |
| 6,014,594 | A | 1/2000 | Heidel et al. | |
| 6,015,344 | A | 1/2000 | Kelly et al. | |
| 6,048,269 | A | 4/2000 | Burns et al. | 463/25 |
| 6,056,642 | A | 5/2000 | Bennett | |
| 6,068,552 | A | 5/2000 | Walker et al. | |
| 6,110,041 | A | 8/2000 | Walker et al. | |
| 6,110,044 | A | 8/2000 | Stern | |
| 6,113,098 | A | 9/2000 | Adams | 273/143 R |
| 6,125,307 | A | 9/2000 | Heidel et al. | |
| 6,126,166 | A | 10/2000 | Lorson et al. | |
| 6,128,550 | A | 10/2000 | Heidel et al. | |
| 6,139,419 | A | 10/2000 | Abe | |
| 6,266,647 | B1 | 7/2001 | Fernandez | |
| 6,290,600 | B1 * | 9/2001 | Glasson | 463/20 |
| 6,293,866 | B1 | 9/2001 | Walker et al. | |
| 6,332,099 | B1 | 12/2001 | Heidel et al. | |
| 6,375,187 | B1 | 4/2002 | Baerlocher | |
| 6,450,887 | B1 | 9/2002 | Mir et al. | |
| 6,500,067 | B1 | 12/2002 | Luciano et al. | |
| 6,500,068 | B2 | 12/2002 | Walker et al. | |
| 6,506,118 | B1 * | 1/2003 | Baerlocher et al. | 463/25 |
| 6,511,377 | B1 | 1/2003 | Weiss | 463/25 |
| 6,530,842 | B1 | 3/2003 | Wells et al. | |
| 6,537,151 | B1 | 3/2003 | Walker et al. | |
| 6,558,255 | B2 | 5/2003 | Walker et al. | |
| 6,558,256 | B1 | 5/2003 | Saunders | |
| 6,579,179 | B2 | 6/2003 | Poole et al. | |
| 6,582,301 | B2 | 6/2003 | Hill | |
| 6,599,192 | B1 | 7/2003 | Baerlocher et al. | |
| 6,609,978 | B1 | 8/2003 | Paulsen | |
| 6,620,047 | B1 | 9/2003 | Alcorn et al. | |
| 6,623,357 | B2 | 9/2003 | Chowdhury | 463/25 |
| 6,626,757 | B2 | 9/2003 | Oliveras | |
| 6,648,754 | B2 | 11/2003 | Baerlocher et al. | |
| 6,743,097 | B2 | 6/2004 | Walker et al. | |
| 6,752,312 | B1 | 6/2004 | Chamberlain et al. | |
| 7,147,558 | B2 | 12/2006 | Giobbi | |
| 7,261,635 | B2 | 8/2007 | Walker et al. | |
| 2002/0128057 | A1 * | 9/2002 | Walker et al. | 463/20 |
| 2002/0173352 | A1 | 11/2002 | Oliveras | |
| 2002/0177479 | A1 * | 11/2002 | Walker et al. | 463/25 |
| 2003/0092477 | A1 | 5/2003 | Luciano, Jr. et al. | |
| 2003/0199320 | A1 | 10/2003 | Nguyen et al. | |
| 2003/0209599 | A1 | 11/2003 | Gatto | |
| 2005/0079908 | A1 | 4/2005 | Pacey | |

FOREIGN PATENT DOCUMENTS

| | | |
|---|---|---|
| GB | 2142457 | 1/1985 |
| GB | 2161008 | 1/1986 |
| GB | 2161009 | 1/1986 |
| GB | 2180682 | 4/1987 |
| GB | 2181589 | 4/1987 |
| GB | 2183882 | 6/1987 |
| GB | 2222712 | 3/1990 |
| WO | 8500910 | 2/1985 |
| WO | 2005/099839 | 10/2005 |

OTHER PUBLICATIONS

Website: “Slot machine maker taking a chance with cashless slots system”, Las Vegas SUN, Jan. 27, 2001, (http //www lasvegassun com/sunbin/stories/gaming/2001/jan/27/511355621 html). 2 pgs.

Stearns, John, “SPAM Beetle Bailey among new slot titles to be unveiled by IGT”, Reno Gazette-Journal, Sep. 28, 2001, Section: Business, p. 1D. 4 pgs.

Website: “Market Mania—Message Detail”, Market Manipulators, (http www marketmanipulators com/msgdetail asp?msgid=820 &msgboard=DAY-TRADING), Jan. 18, 2002. 2 pgs.

“JCM Receives Suppliers License in Illinois”, PR Newswire, Dec. 9, 2002, Section: Financial News. 2 pgs.

Website: “Fiesta Casino Hotel Plans to Put EZ Pay to the Test”, IGT, (http //www igtonline com/info/images/SLwntr00_Ezpay_3.0 pdf), download date: Jun. 6, 2005. 1 pg.

Website: “JCM Corporation”, Company Profile, (http //www jcm-american com/docs/cs_Company%20Profile pdf), downloaded date: Jun. 6, 2005. 1 pg.

Description of Tokenization Feature in Gaming Machines written by IGT, published prior to 2000.

Non-Final Office Action dated Dec. 23, 2003 from U.S. Appl. No. 10/439,357, pp. 1-9.

Non-Final Office Action dated Jun. 26, 2008 from U.S. Appl. No. 11/014,078, pp. 1-10.

Non-Final Office Action dated Nov. 25, 2009 from U.S. Appl. No. 11/305,796, pp. 1-6.

* cited by examiner

400

| | CASHOUT AMOUNT 402 | OFFER TYPE 404 | OFFER IDENTIFIER 406 |
|---|---|---|---|
| 408 | $0.25 - $10.00 | BUFFET | OF-000598 |
| 410 | $10.25 - $30.00 | STEAKHOUSE | OF-000655 |
| 412 | $30.25 AND UP | HOTEL | OF-000153 |

FIG. 4A

450

| | DATE/TIME 452 | OFFER TYPE 454 | OFFER IDENTIFIER 456 |
|---|---|---|---|
| 458 | THURSDAY - SUNDAY | HOTEL | OF-000153 |
| 460 | MONDAY - THURSDAY | BUFFET | OF-000579 |
| 462 | 1 A.M. – 12 P.M. | SEAFOOD LUNCH | OF-000530 |
| 464 | 1 P.M. – 3 A.M. | STEAKHOUSE | OF-000153 |

FIG. 4B

500

| | PLAYER IDENTIFIER 502 | NAME 504 | ADDRESS 506 | PREFERRED OFFERS 508 | OFFERS SELECTED 510 | OFFERS REDEEMED 512 |
|---|---|---|---|---|---|---|
| 514 | P-000001 | BOB JONES | 15 ELM STREET SPRINGFIELD, NY | - | OF-000153 | - |
| 516 | P-000002 | MARIA LOPEZ | 35 GUMDROP DRIVE CAPITAL CITY, CA | OF-000745, OF-001564, OF-000578... | OF-000807, OF-000745, OF-001564 | OF-000745, OF-001564 |
| | ○ ○ ○ | ○ ○ ○ | ○ ○ ○ | ○ ○ ○ | ○ ○ ○ | ○ ○ ○ |
| 518 | P-106998 | SEAN WILLIAMS | 140 MAIN STREET PRAIRIEVILLE, ND | - | - | - |
| 520 | P-106999 | MARY BROWN | 65 BEACH LANE APT.1 BEACH CITY, NJ | OF-000337 | OF-000605 OF-000337 | OF-000337 |

FIG. 5

600

| | RANK 602 | FACTORS FOR DETERMINING OFFER / OFFER TYPE 604 | SATISFYING CONDITION 606 |
|---|---|---|---|
| 608 | 1 | INVENTORY/CAPACITY | SHOW LESS THAN 50% FULL |
| 610 | 2 | PLAYER HISTORY/STATUS | PLAYER IS HOTEL GUEST |
| | ∘ ∘ ∘ | ∘ ∘ ∘ | ∘ ∘ ∘ |
| 612 | N | DATE/TIME | - |

FIG. 6

700

| | OFFER TYPE 702 | OFFER IDENTIFIER 704 | OFFER DESCRIPTION 706 |
|---|---|---|---|
| 708 | HOTEL | OF-000153 | "GET $[VALUE] IN HOTEL CREDIT INSTEAD OF YOUR CASHOUT!" |
| 710 | HOTEL | OF-000154 | "GET A FREE ROOM UPGRADE – A $30 VALUE!" |
| 712 | STEAKHOUSE | OF-000655 | "GET $[VALUE] IN STEAKHOUSE CREDIT!" |
| 714 | STEAKHOUSE | OF-000656 | "GET A FREE APPETIZER!" |
| 716 | STEAKHOUSE | OF-000657 | "FREE DINNER FOR TWO – WORTH UP TO $120 IN VALUE!" |

FIG. 7A

750

| | OFFER TYPE 752 | OFFER IDENTIFIER 754 | OFFER DESCRIPTION 756 |
|---|---|---|---|
| 758 | HOTEL | OF-000153 | “GET $[VALUE] IN HOTEL CREDIT INSTEAD OF YOUR CASHOUT TICKET!” |
| 760 | BUFFET | OF-000598 | “GET $[VALUE] IN BUFFET CREDIT INSTEAD OF YOUR CASHOUT TICKET!” |
| 762 | STEAKHOUSE | OF-000655 | “GET $[VALUE] IN STEAKHOUSE CREDIT INSTEAD OF YOUR CASHOUT TICKET!” |
| 764 | GIFT SHOP | OF-000887 | “GET $[VALUE] IN GIFT SHOP CREDIT INSTEAD OF YOUR CASHOUT TICKET!” |
| 766 | SPA | OF-000220 | “GET $[VALUE] IN SPA CREDIT INSTEAD OF YOUR CASHOUT TICKET!” |

FIG. 7B

800

| | OFFER IDENTIFIER 802 | OFFER TYPE 804 | OFFER VALUE 806 | MINIMUM VALUE 808 | MAXIMUM VALUE 810 |
|---|---|---|---|---|---|
| 812 | OF-000655 | STEAKHOUSE | 1.5 X [CASHOUT] | - | $20 |
| 814 | OF-000153 | HOTEL | 2 X [LOSS AMOUNT] | $10 | - |
| | ∘ ∘ ∘ | ∘ ∘ ∘ | ∘ ∘ ∘ | ∘ ∘ ∘ | ∘ ∘ ∘ |
| 816 | OF-000598 | BUFFET | $15 | - | - |
| 818 | OF-000887 | GIFT SHOP | 1.5 X [BUY-IN AMOUNT] | $5 | $100 |

FIG. 8

900

| | CASHOUT AMOUNT 902 | # OF CASHOUT RECEIPTS 904 | FIRST RECEIPT VALUE 906 | SECOND RECEIPT VALUE 908 | THIRD RECEIPT VALUE 910 |
|---|---|---|---|---|---|
| 912 | $0.25 - $10.00 | 1 | [CASHOUT AMOUNT] | - | - |
| 914 | $10.25 - $30.00 | 2 | $10 | [CASHOUT AMOUNT] - $10 | - |
| 916 | $30.25 AND UP | 3 | $10 | $20 | [CASHOUT AMOUNT] - $30 |

FIG. 9

1000

| | RECEIPT IDENTIFIER 1002 | CASH VALUE 1004 | PLAYER IDENTIFIER 1006 | TIME/DATE OUTPUT 1008 | OFFER IDENTIFIER(S) 1010 | REDEEMED 1012 | EXPIRED 1014 |
|---|---|---|---|---|---|---|---|
| 1016 | 109583 | $9.75 | P-106998 | 5:30 PM; 5/5/04 | OF-000598, OF-000220... | 109583 (CASH) | OF-000220 |
| 1018 | 109584 | $18.25 | P-109087 | 11:26 PM; 4/27/04 | OF-000745, OF-001564... | - | - |
| | ∘∘∘ | ∘∘∘ | ∘∘∘ | ∘∘∘ | ∘∘∘ | ∘∘∘ | ∘∘∘ |
| 1020 | 110782 | $63.00 | P-102205 | 10:17 AM; 12/20/03 | - | - | 110782 |
| 1022 | 110783 | $15.50 | P-107710 | 9:52 AM; 11/17/03 | OF-000337 | OF-000337 | - |

FIG. 10

1100

| | SPONSOR IDENTIFIER 1102 | BOUNTY VALUE 1104 |
|---|---|---|
| 1106 | SPORTS ILLUSTRATED | $8 |
| 1108 | COLUMBIA HOUSE | $15 |
| 1110 | AT&T | $20 - $30 |
| 1112 | NETFLIX | $32 |
| 1114 | DISCOVER | $35 - $50 |

FIG. 11

| # of tickets: | 1 | 2 | 3 |
|---|---|---|---|
| Royal Flush | 5,000 | 2,000 | 200 |
| Straight Flush | 1,000 | 500 | 25 |
| 5 of a Kind | - | 250 | 20 |
| 4 of a Kind | 250 | 25 | 5 |
| Full House | 100 | 15 | - |
| Flush | 75 | 3 | - |
| Straight | 50 | 2 | - |

METHODS, SYSTEMS AND APPARATUS FOR FACILITATING CASHOUT OPTIONS AT A GAMING DEVICE

The present application is a continuation of International Patent Application No. PCT/US2005/011747, filed Apr. 7, 2005, entitled "METHODS, SYSTEMS AND APPARATUS FOR FACILITATING CASHOUT OPTIONS AT A GAMING DEVICE", published under International Publication No. WO2005/099839 A1 on Oct. 27, 2005;

which application (A) claims the benefit of (i) U.S. provisional Patent Application No. 60/560,314, entitled "Method, System and Apparatus for Providing Gaming Device Cashout Options," filed on Apr. 7, 2004, and (ii) U.S. provisional Patent Application No. 60/581,085, entitled "Apparatus, Systems and Methods for Facilitating Alternate Gaming Device Payments," filed on Jun. 18, 2004; and which application (B) also claims the benefit of International Patent Application No. PCT/US2005/002233, entitled "Products and Processes for Cashless Gaming," filed on Jan. 20, 2005, published under International Publication No. WO2005/070509 A1 on Aug. 4, 2005.

The content of each of the above applications is incorporated herein by reference.

BRIEF DESCRIPTION OF THE DRAWINGS

FIGS. 4A-B are tables illustrating exemplary data structures of an offer determination database according to various embodiments of the present invention;

FIG. 5 is a table illustrating an exemplary data structure of a player database according to some embodiments of the present invention;

FIG. 6 is a table illustrating an exemplary data structure of an offer criteria hierarchy database according to some embodiments of the present invention;

FIGS. 7A-B are tables illustrating exemplary data structures of an offer type database according to various embodiments of the present invention;

FIG. 8 is a table illustrating an exemplary data structure of an offer value database according to some embodiments of the present invention;

FIG. 9 is a table illustrating an exemplary data structure of a number of cashout receipts database according to some embodiments of the present invention;

FIG. 10 is a table illustrating an exemplary data structure of a cashout receipt database according to some embodiments of the present invention;

FIG. 11 is a table illustrating an exemplary data structure of a sponsor offer database according to some embodiments of the present invention;

DETAILED DESCRIPTION

Figure 1:
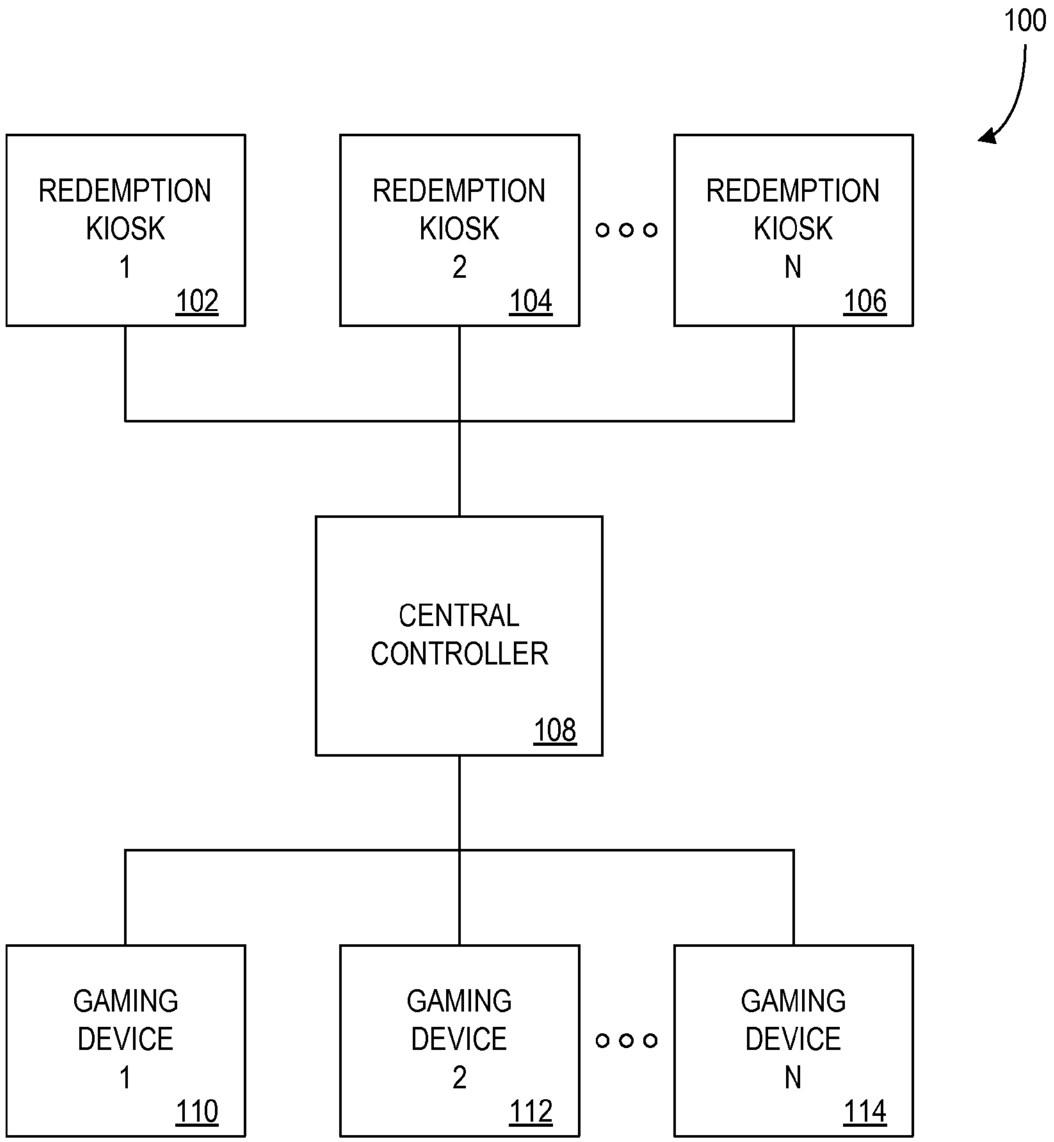
FIG. 1 is a diagram illustrating a system overview according to some embodiments of the present invention.

In the following description, reference is made to the accompanying drawings that form a part of the present disclosure, and in which are shown, by way of illustration, specific embodiments of the invention. These embodiments are described in sufficient detail to enable those skilled in the art to practice the invention, and it is to be understood that other embodiments may be utilized and that structural, logical, software, electrical and other changes may be made without departing from the scope of the present invention. The present disclosure is, therefore, not to be taken in a limiting sense. The present disclosure is neither a literal description of all embodiments of the invention nor a listing of features of the invention that must be present in all embodiments.

Numerous embodiments are described in this patent application, and are presented for illustrative purposes only. The described embodiments are not intended to be limiting in any sense. The invention is widely applicable to numerous embodiments, as is readily apparent from the disclosure herein. Those skilled in the art will recognize that the present invention may be practiced with various modifications and alterations. Although particular features of the present invention may be described with reference to one or more particular embodiments or figures, it should be understood that such features are not limited to usage in the one or more particular embodiments or figures with reference to which they are described.

The terms "an embodiment", "embodiment", "embodiments", "the embodiment", "the embodiments", "an embodiment", "some embodiments", and "one embodiment" mean "one or more (but not all) embodiments of the present invention(s)" unless expressly specified otherwise.

The terms "including", "comprising" and variations thereof mean "including but not limited to", unless expressly specified otherwise.

The term "consisting of" and variations thereof mean "including and limited to", unless expressly specified otherwise.

The enumerated listing of items does not imply that any or all of the items are mutually exclusive. The enumerated listing of items does not imply that any or all of the items are collectively exhaustive of anything, unless expressly specified otherwise. The enumerated listing of items does not imply that the items are ordered in any manner according to the order in which they are enumerated.

The terms "a", "an" and "the" mean "one or more", unless expressly specified otherwise.

The methods described herein (regardless of whether they are referred to as methods, processes, algorithms, calculations, and the like) inherently include one or more steps. Therefore, all references to a "step" or "steps" of such a method have antecedent basis in the mere recitation of the term 'method' or a like term. Accordingly, any reference in a claim to a 'step' or 'steps' of a method is deemed to have sufficient antecedent basis.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary, a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described in this patent application does not, in and of itself, indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

It will be readily apparent that the various methods and algorithms described herein may be implemented by, e.g., appropriately programmed general purpose computers and computing devices. Typically a processor (e.g., a microprocessor) will receive instructions from a memory or like device, and execute those instructions, thereby performing a process defined by those instructions. Further, programs that implement such methods and algorithms may be stored and transmitted using a variety of known media.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article.

The functionality and/or the features of a device may be alternatively embodied by one or more other devices which are not explicitly described as having such functionality/features. Thus, other embodiments of the present invention need not include the device itself.

The term "computer-readable medium" as used herein refers to any medium that participates in providing data (e.g., instructions) that may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Various forms of computer readable media may be involved in carrying sequences of instructions to a processor. For example, sequences of instruction (i) may be delivered from RAM to a processor, (ii) may be carried over a wireless transmission medium, and/or (iii) may be formatted according to numerous formats, standards or protocols, such as Bluetooth, TDMA, CDMA, 3G.

Where databases are described, it will be understood by one of ordinary skill in the art that (i) alternative database structures to those described may be readily employed, (ii) other memory structures besides databases may be readily employed. Any schematic illustrations and accompanying descriptions of any sample databases presented herein are illustrative arrangements for stored representations of information. Any number of other arrangements may be employed besides those suggested by the tables shown. Similarly, any illustrated entries of the databases represent exemplary information only; those skilled in the art will understand that the number and content of the entries can be different from those illustrated herein. Further, despite any depiction of the databases as tables, other formats (including relational databases, object-based models and/or distributed databases) could be used to store and manipulate the data types described herein. Likewise, object methods or behaviors of a database can be used to implement the processes of the present invention. In addition, the databases may, in a known manner, be stored locally or remotely from a device that accesses data in such a database.

DEFINITIONS

The following terms are defined as indicated below, unless explicitly described otherwise:

Gaming device: electrical or mechanical device that accepts wagers on game outcomes, determines or receives outcomes of the game, and dispenses and/or obtains winnings based upon the outcomes. The outcome may be random, based on player skill, or a combination of both randomness and player skill. The gaming device may comprise, for example, a slot machine, a video poker machine, a video blackjack machine, a video keno machine, a video lottery machine, a pachinko machine, a table-top game, a personal computer (e.g., which communicates with an online casino/gaming device operator Web site), a telephone (e.g., to communicate with an automated sports book that provides gaming services), or a portable handheld gaming device (e.g., a PDA) or the like. The gaming device may comprise any or all of the gaming devices of the aforementioned systems. In some embodiments, a user device such as a PDA or cell phone may be used in place of, or in addition to, some or all of the gaming device components.

Controller, Central Controller, Slot Server, Server: One or more electronic devices (e.g., a computer, two distinct servers) that communicates with one or more gaming devices. A controller may manage, direct or otherwise affect the actions of gaming devices, such as by providing a random number to a gaming device, by reading data about a player playing a gaming device. A controller may also contain or otherwise be configured to read data from (or cause data to be read from) and/or write data to (or cause data to be written to) one or more (local or remote) databases regarding, among other things, (i) data associated with a particular cashout receipt, cashless gaming ticket or coupon, (ii) player data, (iii) payout data, (iv) probability data, etc.

Wager: a bet on the outcome of a game, where the game may be one of skill, randomness or a combination of both skill and randomness.

Game: A wagering activity whereby a player posts consideration, usually monetary in form, in exchange for a chance at winning a payout (which is typically a monetary payout). The game may comprise one event, a sequence/series of events or a combination of successive events. The definition is intended to include basic games and bonus games.

Currency: any form of consideration accepted by the gaming device operator, including cash, electronic funds, tokens, vouchers, receipts, chips, tickets or credits that may be exchanged for cash or cash equivalents. Currency is accepted by the gaming device in exchange for a credit balance that may be used for game wagers. Alternatively, currency may include benefits of varying value.

Payout: an amount due to a player based upon a combination of the game wager and outcome of the game.

Cashout or Cash out: a process by which a player is provided with payment from the gaming device. Payment may be made in currency, benefits or other options presented to the player.

Cashout amount: an amount of currency a player receives as payment from a gaming device. The payment may be based on the credit balance associated with the gaming device.

Credit balance or Balance: an indication of the amount of currency due to the player at the present time.

Player: an individual, group of individuals, organization or party.

Offer: a proposal put forward to a player for either acceptance or rejection, or counter-offer.

Benefit: a value or alternate payment associated with an offer provided to a player upon acceptance of the offer.

Bonus round or bonus game: an additional game wherein a player may make an additional wager or receive an outcome based upon the original game wager.

Meta-game: A meta-game may enable a receipt recipient to attain a benefit without wagering any additional credits or currency. In some embodiments, a player may attain a benefit associated with a meta-game in addition to attaining (i) currency associated with a receipt, or (ii) a benefit associated with an offer. For example, a player may (i) attain a cash payout from winning a meta-game, and (ii) exchange a cash-out ticket for currency at a casino cage. In other embodiments, a player must forfeit a cashout ticket and/or offer strip to play a meta-game (i.e., a meta-game entry is an alternate payout offer).

Indicium/Indicia (associated with play of a gaming device): one or more indicia that may be input to a gaming device in order to instruct the gaming device to perform a function. The indicia may be in tangible form, such as a plastic card having a player tracking identifier stored thereon or a paper cashout receipt. The indicia may also be intangible in form, such as a code that may be typed into a keypad or touchscreen of a gaming device. For example, an indicium comprising a cashout receipt may be input into a ticket reader component of a gaming device in order to instruct the gaming device to perform functions such as (i) confirming the validity of the receipt (e.g., based on an identifier printed on the receipt), (ii) determining a value associated with the receipt, and/or (iii) setting a credit meter balance of the gaming device to reflect an amount of credits, the amount being based on a value of the receipt. Examples of indicia associated with play of a gaming device include, but are not limited to, a primary wagering instrument, a supplemental wagering instrument, a cashout receipt and an offer panel (each of which is described in detail below).

Primary wagering instrument: an instrument associated with an amount of currency that may be available or that may be made available for wagering, wherein the amount of currency is recognizable by a device such as a gaming device upon the primary wagering instrument being input into the device. Examples of a primary wagering instrument include, but are not limited to, a cashout receipt or cashout ticket, a player tracking card or other account identifier (e.g., a credit or debit card), a smart card, a casino token, and currency in the form of coins and bills.

Supplemental wagering instrument: an instrument associated with an instruction to (i) modify the amount of currency associated with a primary wagering instrument and/or (ii) make an amount of currency available for wagering, the amount of currency to be made available being based on at least one other wagering instrument along with which the supplemental wagering instrument is redeemed. One example of a supplemental wagering instrument is an offer panel, which is defined below. Such an offer panel may have printed or otherwise stored thereon, for example, an indication of an instruction to double, up to a $10 value, an amount of credits associated with a cash-out ticket along with which the offer panel is redeemed.

Receipt, Cash-Out receipt, or Cashout receipt: a substrate (e.g., a small piece of paper, player tracking card, etc.) that may be output and/or received by a device such as a gaming device (e.g., via a "ticket-in/ticket-out" slot of a gaming device or its peripheral) and that is redeemable for currency or another benefit (or a combination of cash and a benefit) and/or may be used for wagering purposes. A receipt may be issued by a game or gaming device, or as a result of a communication from a game or gaming device to associated equipment. A receipt may be associated with a value that is based on a credit meter balance of a gaming device at the time a player requests to cash out the balance and is issued the receipt. A cashout receipt may comprise indicia, including (i) machine-readable indicia (e.g., a bar code) or other machine-readable substance (e.g., magnetically encoded material) and/or (ii) an identifier (e.g., a unique series of numeric digits or alphanumeric characters). In one or more embodiments, machine-readable indicia may indicate an identifier (e.g., a printed barcode encodes a receipt identifier). In one embodiment, a database stored at a central location (e.g., a server operable to communicate with one or more gaming devices, one or more casino attendant terminals and/or other devices) may store records of issued cash-out receipts, each record correlating an identifier of a cash-out receipt to a value. A cash-out receipt may entitle its bearer (or a specified person) to an amount of credits or currency equal to an indicated face value or to an amount based on an indicated face value. A cashout receipt may include a plurality of panels or sheets that may or not be severable from one another.

In one embodiment, a cashout receipt may further comprise one or more offer panels (which is described below)

Redeem: exchange directly or indirectly. For example, a receipt bearing an offer for a credit at the steakhouse for $20 may be exchanged directly at the steakhouse for the $20 credit or may be exchanged at another device (e.g., a kiosk) for a voucher that may be applied at the steakhouse for a $20 credit.

Player Tracking Card: Most casinos issue plastic cards (resembling frequent shopper cards) to players as a way of identifying the player at a slot machine or table game. As is well known in the art, such cards typically have encoded thereon (in machine-readable and/or human readable form) a player identifier (e.g., a six digit number) that uniquely identifies the player (e.g., because the number is associated with a record in a player database that includes corresponding player information). At a slot machine, the player inserts the card into a reader device and the player identifier is read from the card, most often magnetically or optically. From the player identifier, which the reader device reads, the corresponding player information may in turn be read from the database, typically via a network connection between the reader device and a device hosting the database.

Offer Panel: a substrate that may be output and/or received by a device such as a gaming device or kiosk (e.g., via a "ticket-in/ticket-out" slot of a gaming device, kiosk or a peripheral device associated therewith) and that is associated with a benefit to be provided upon the offer panel being redeemed.

An offer panel may be issued by a game or gaming device or kiosk, or as a result of a communication from a game, gaming device or kiosk to associated equipment. An offer panel may be provided to a player substantially at the time it is issued (e.g., a gaming device or kiosk may print and output an offer panel; upon a player cashing out a credit meter balance. In one embodiment, an offer panel may be issued in conjunction with a cashout receipt. In some embodiments, an offer panel may be a portion of a cashout receipt. In one embodiment, an offer panel is issued to a specific player and may even be associated with a particular player identifier (e.g., a player identifier may be printed on the offer panel and/or a player identifier may be associated in a record of a database with an identifier identifying the offer panel). In another embodiment, an offer panel may not be issued to a specific player and/or may not be associated with a specific player (e.g., a particular offer panel may be printed and output to a particular player but may be a bearer instrument in the sense that another player may subsequently obtain and redeem the offer panel in accordance with any redemption conditions associated with the offer panel).

In one embodiment, the benefit associated with an offer panel is an alteration of a value of a parameter (e.g., a parameter of another ticket, a parameter of a gaming device, etc.). For example, an offer panel may indicate: "Insert along with any cashless gaming receipt valued between $25 and $100 to receive five bonus spins." Such an indication may be in machine and/or human readable format, such that it may be read by (i) the bearer of the offer panel (e.g., as per text printed on the offer panel), and/or (ii) a gaming device into which the offer panel has been inserted (e.g., as per machine-readable indicia). Thus, in some embodiments, an offer panel may be said to have no intrinsic value—its value may only be realized when used in combination with a receipt.

In some embodiments, as will be described below, the benefit and/or value of the benefit associated with an offer panel may be based on a value or other parameter of the other ticket along with which the offer panel is redeemed (e.g., the offer panel may define a benefit of a 10% increase in the value of a cash-out ticket along with which it is redeemed).

EXAMPLES OF CERTAIN EMBODIMENTS

FIG. 1 depicts a system overview of an embodiment of the present invention. A system 100 includes a central controller 108 connected to a redemption kiosk 102 and a gaming device 110.

Figure 2:
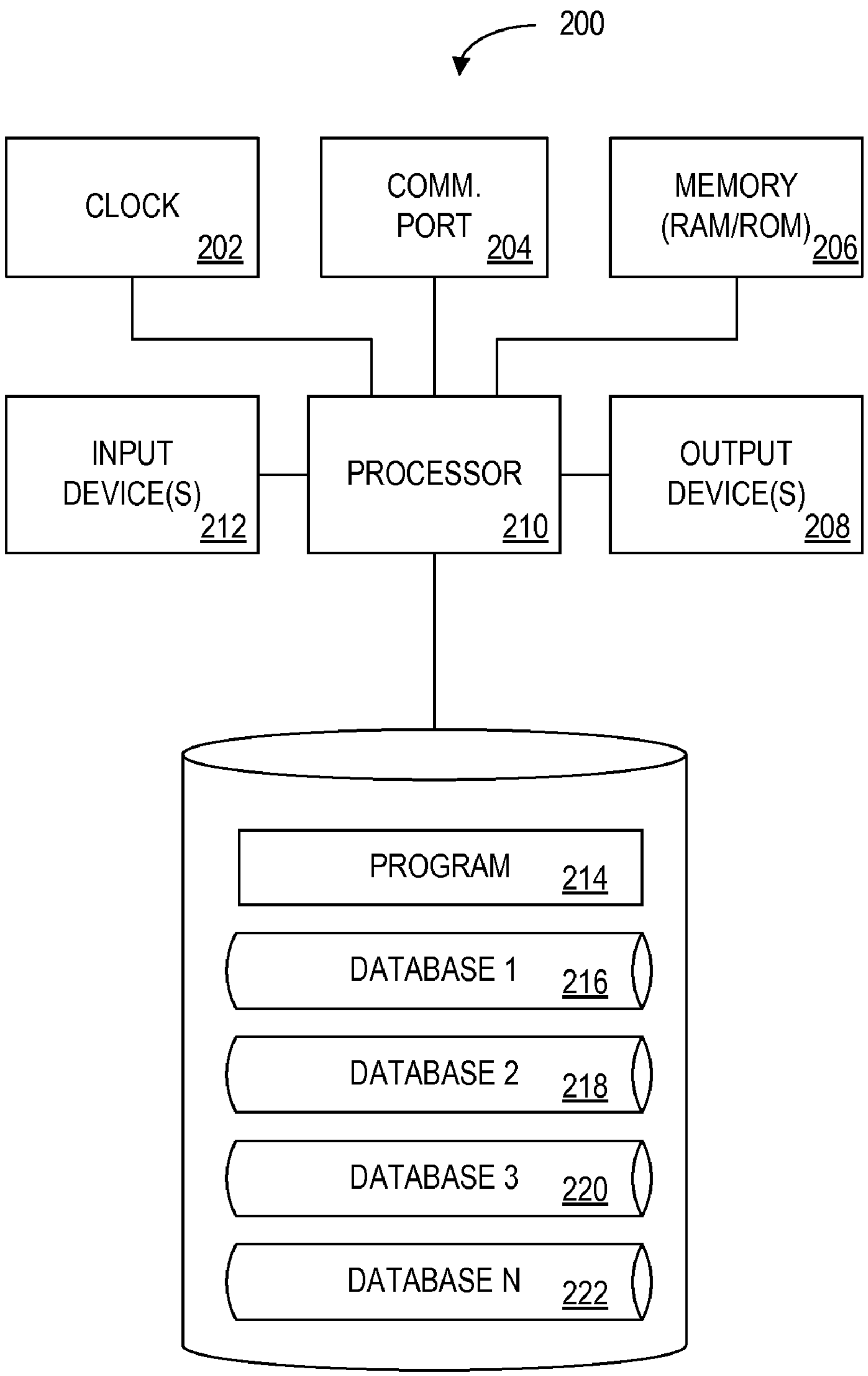
FIG. 2 is a diagram illustrating an example gaming device according to some embodiments of the present invention.

FIG. 2 depicts a gaming device 200 according to some embodiments of the present invention. A gaming device 200 comprises a clock 202, comm. port 204, memory 206, output devices 208, processor 210, input devices 212, a program 214 and at least one database 216.

Figure 3:
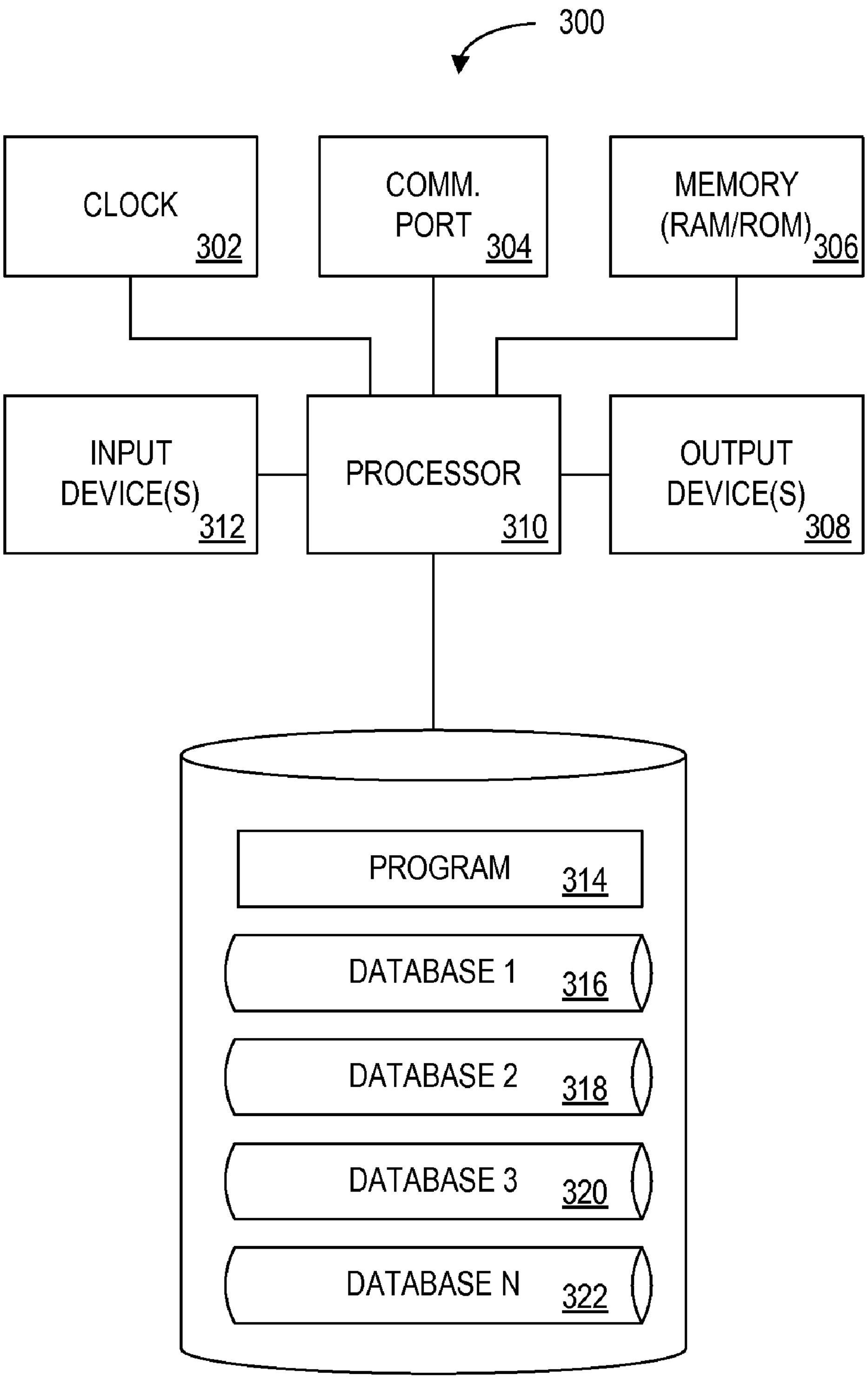
FIG. 3 is a table illustrating an example redemption kiosk according to some embodiments of the present invention.

FIG. 3 depicts a kiosk 300 according to some embodiments of the present invention. Kiosk 300 comprises a clock 302, comm. port 304, memory 306, output devices 308, processor 230, input devices 312, a program 314 and at least one database 316.

FIG. 4A depicts a cashout amount offer determination database 400 according to some embodiments of the present invention. The database includes data structures indicating a cashout amount column 402, offer type column 404, and an offer identifier column 406. FIG. 4B depicts a date/time offer determination database 450 according to some embodiments of the present invention. The database includes a date/time column 452, offer type column 454 and an offer identifier column 456.

FIG. 5 depicts and exemplary player database 500 containing data structures indicating a player identifier column 502, name column 504, address column 506, preferred offers column 508, offers selected column 510 and offers redeemed column 512.

FIG. 6 depicts an offer criteria hierarchy database 600 according to some embodiments of the present invention. The database contains data structures indicating rank column 602, factors column 604 and satisfying condition column 606.

FIG. 7A depicts an embodiment an offer type database 700 including data structures indicating an offer type column 702, offer identifier column 704 and an offer description column 706. FIG. 7B depicts another embodiment of an offer type database 750 including data structures indicating an offer type column 752, offer identifier column 754 and an offer description column 756.

FIG. 8 depicts an offer value database 800 according to some embodiments of the present invention, including data structures indicating an offer identifier column 802, offer type column 804, offer value column 806, minimum value column 808 and maximum value column 810.

FIG. 9 depicts a number of cashout receipts database 900 according to some embodiments of the present invention, including data structures indicating a cashout amount column 902, number of cashout receipts column 904, first receipt value column 906, second receipt value column 908 and third receipt value column 910.

FIG. 10 depicts a cashout receipt database 1000 according to some embodiments of the present invention, including data structures indicating a receipt identifier column 1002, cash value column 1004, player identifier column 1006, time/date output column 10008, offer identifier column 1010, redeemed column 1012, and expired column 1014.

FIG. 11 depicts a sponsor offer database 1100 according to some embodiments of the present invention. The database includes data structures indicating a sponsor identifier column 1102 and a bounty value column 1104.

Figure 12A:
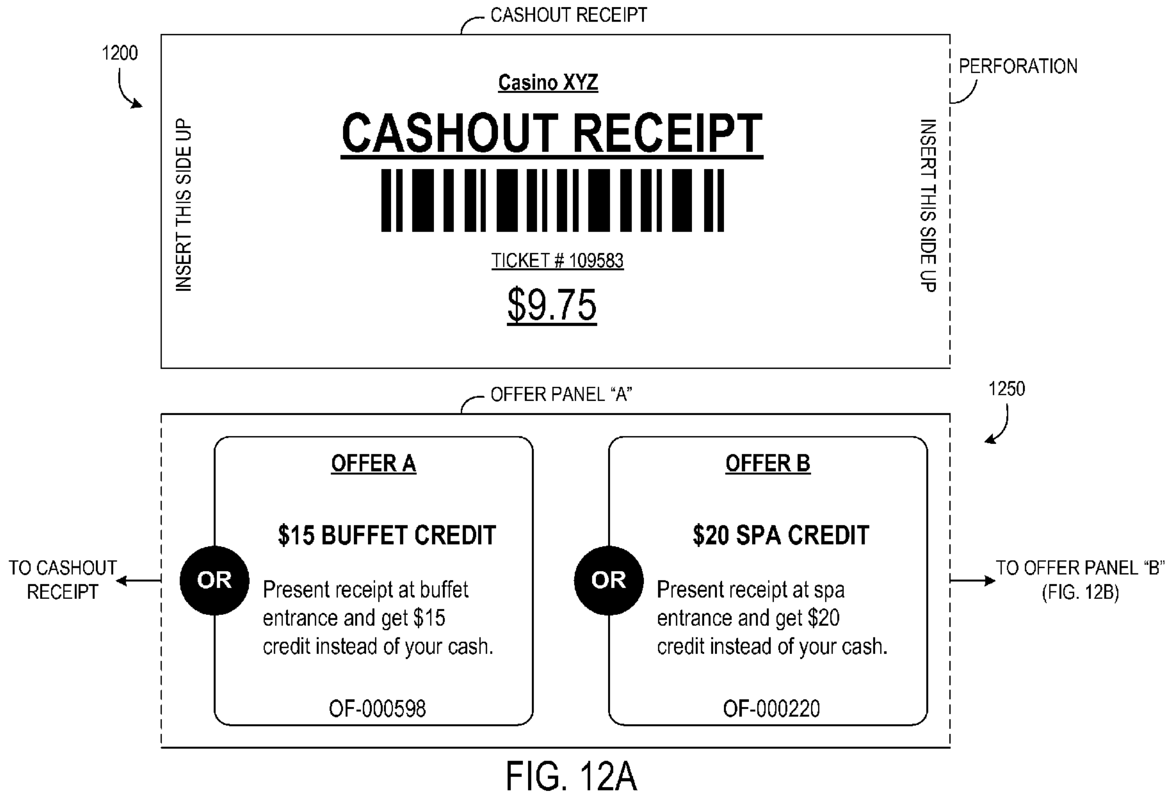
FIGS. 12A-B are together an illustration of a cashout receipt according to some embodiments of the present invention.
Figure 12B:
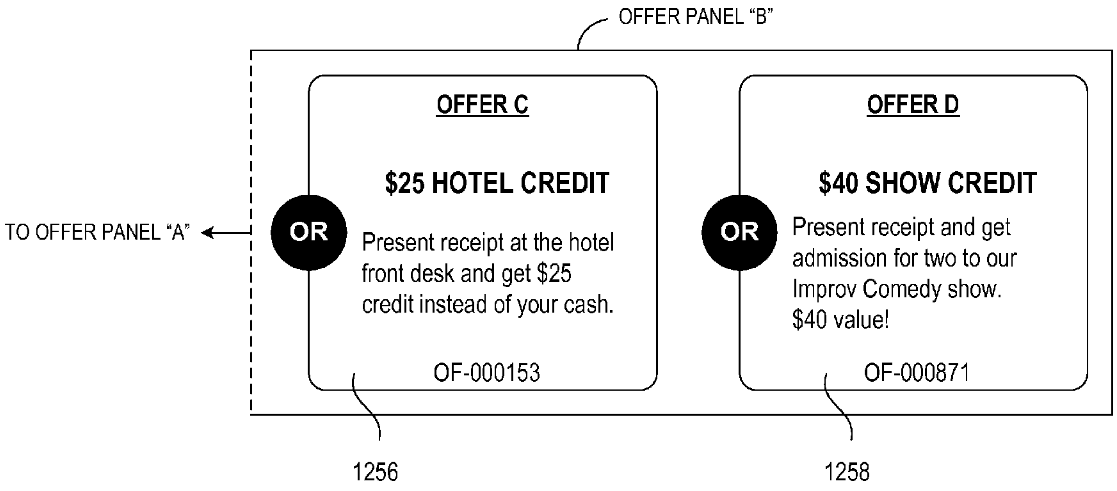

FIG. 12A depicts an exemplary cashout receipt 1200 and an offer panel 1250. The offer panel 1250 provides a first offer 1252 and a second offer 1254. FIG. 12B depicts an offer panel providing a third offer 1256 and a fourth offer 1258.

Figure 13:
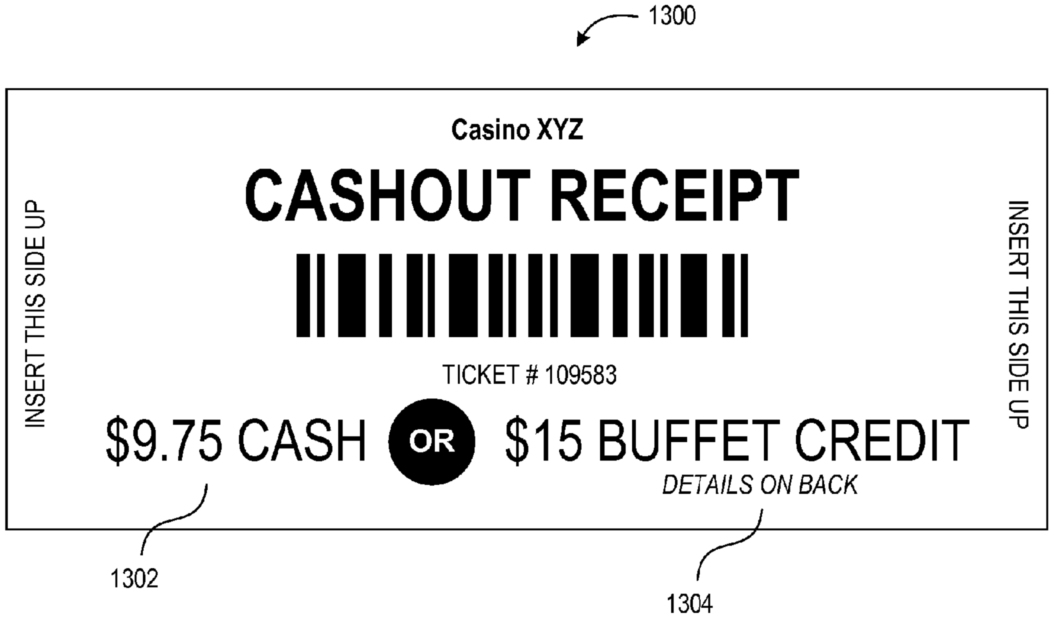
FIG. 13 is an illustration of a cashout receipt according to some embodiments of the present invention.

FIG. 13 depicts an embodiment of a cashout receipt 1300 and indicia indicating a redemption value 1302 and a benefit value 1304.

Figure 14:
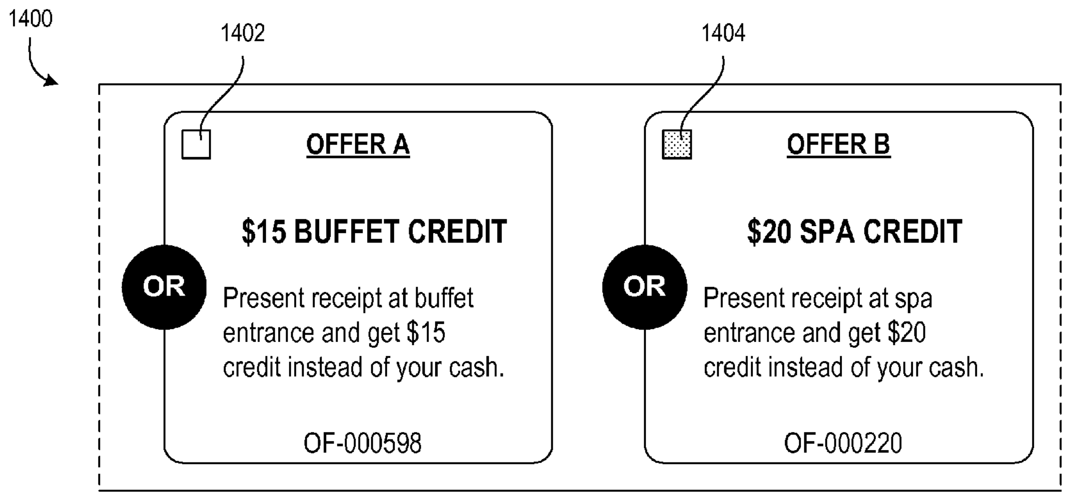
FIG. 14 is an illustration of a cashout receipt according to some embodiments of the present invention.

FIG. 14 depicts and embodiment of an offer panel. The offer panel contains a first selection area 1402 and a second selection area 1404 for player indication, selection or acceptance of an offer.

Figure 15:
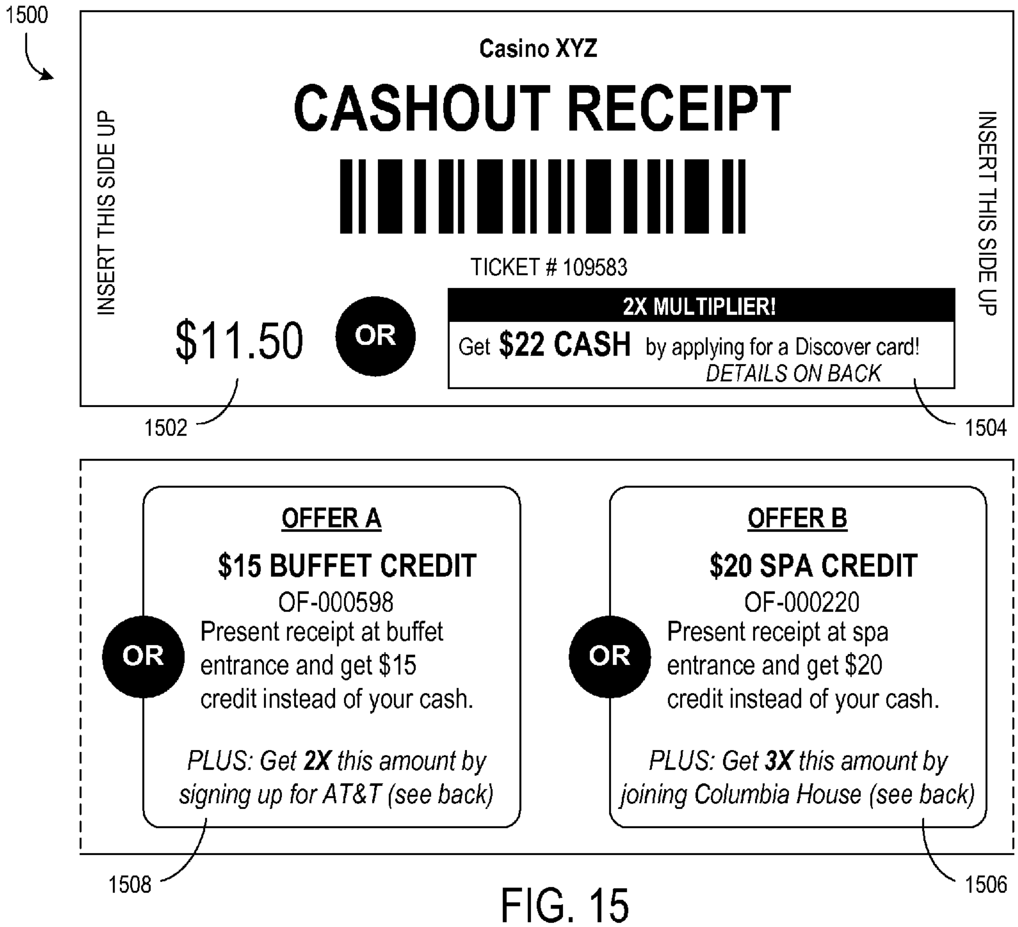
FIG. 15 is an illustration of a cashout receipt according to some embodiments of the present invention.

FIG. 15 depicts an embodiment of a cashout receipt 1500 and indicia indicating a redemption value 1502 and an offer 1504. A first offer 1506 and a second offer 1508 are also provided.

Figure 16:
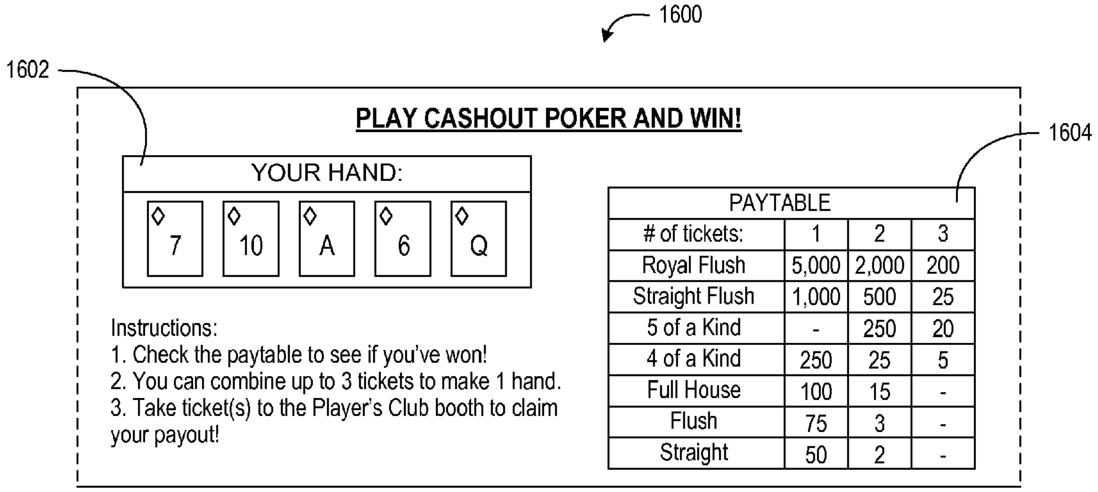
FIG. 16 is an illustration of a meta-game panel of a cashout receipt according to some embodiments of the present invention.

FIG. 16 depicts an embodiment of a cashout receipt meta-game panel 1600 indicating both a meta-game outcome 1602 and a pay table 1604.

Figure 17:
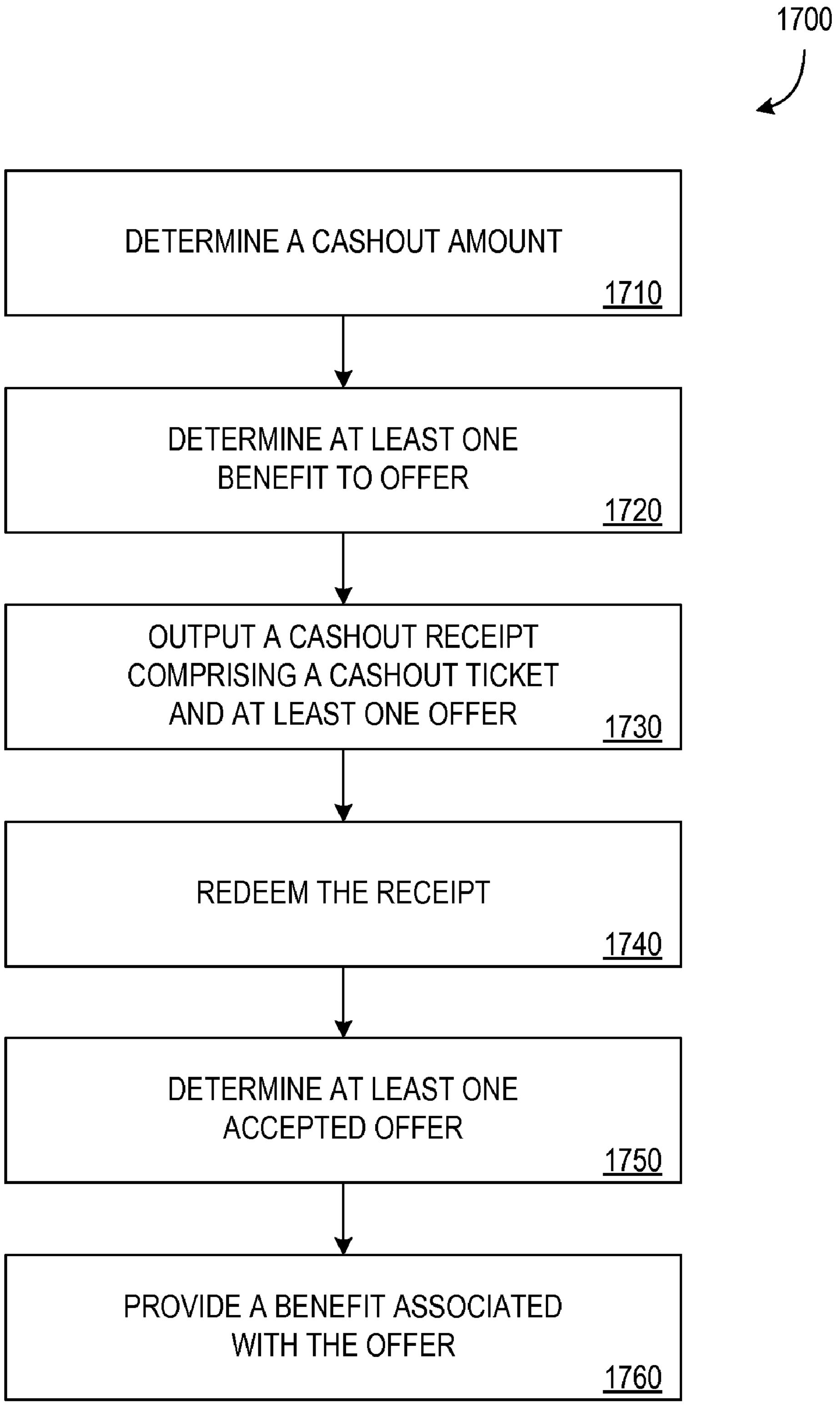
FIG. 17 is a flowchart illustrating exemplary process steps according to some embodiments of the present invention.

FIG. 17 depicts a flow chart of one embodiment of the method 1700 of the present invention. The process steps include determining a cashout amount 1710, determining at least one offer 1720, outputting a cashout receipt and at least one offer 1730, receiving a cashout receipt 1740, determining at least one accepted offer 1750 and providing a benefit associated with the offer 1760.

In some embodiments of the present invention, a gaming device may be configured to receive or accept currency, adjust a balance associated with a gaming device by an amount of currency received, receive a game wager, determine or receive an outcome of a game, adjust a balance associated with a gaming device by a payout based on an outcome, receive a request for a cashout from a player, determine at least one benefit, and provide at least one offer to a patron/player. In some embodiments, an offer may be provided as indicia corresponding to a plurality of values where indicia may be provided visually (e.g., on a monitor), aurally (e.g., presented via a speaker) and/or in a hard copy (e.g., a receipt, ticket or card). One of ordinary skill will recognize a player to be one example of a patron. Various embodiments of a player include casino patrons, customers, recipients, etc.

It is envisioned that a value of a benefit of an offer may be greater than a cashout amount at the time a cashout request is received. Further, it is envisioned that in some embodiments, in response to a request for a cashout a player may be provided with indicia corresponding to a plurality of values. In other embodiments, in response to a request for a cashout, a player may be provided with an indicium corresponding to one or more values. One of ordinary skill in the art will appreciate that a receipt is one example of an indicium corresponding to a plurality of values. However, various embodiments of indicia corresponding to a plurality of values include, but are not limited to, primary wagering instruments, supplemental wagering instruments, receipts, records, vouchers, cashout receipts, cashout strips, cashout tickets, cashout offers, cashout panels, offer panels, alternate payment offers, tickets, strips, panels, computer-readable indicia (e.g., barcodes, smartcards, etc.), codes (e.g., personal identification numbers, database identifiers, etc.), magnetic stripes (e.g., credit cards, player tracking cards, etc.) and optical media (e.g., compact discs, digital video discs, wavelength encoded information. etc.).

General System Overview

The present invention may be configured to work in a network environment including a computer (e.g., a casino server) that is in communication, via a communications network, with one or more devices, such as gaming devices (e.g., slot machines, video poker machines), kiosks, casino personnel devices, merchant point-of-sale (POS) terminals, component devices (e.g., display screens), peripheral devices (e.g., card readers) and so on. The computer may communicate with the devices directly or indirectly, via a wired or wireless medium such as the Internet, LAN, WAN or Ethernet, Token Ring, or via any appropriate communications means or combination of communications means. Each of the devices may comprise computers, such as those based on the Intel® Pentium® processor, that are adapted to communicate with the computer. Any number and type of devices may be in communication with the computer. Communication between the devices and the computer, and among the devices, may be direct or indirect, such as over the Internet through a Web site maintained by computer on a remote server or over an online data network including commercial online service providers, bulletin board systems and the like. In yet other embodiments, the devices may communicate with one another and/or the computer over RF, cable TV, satellite links and the like.

Some, but not all, possible communication networks that may comprise the network or be otherwise part of the system include: a local area network (LAN), a wide area network (WAN), the Internet, a telephone line, a cable line, a radio channel, an optical communications line, and a satellite communications link. A variety of communications protocols may be part of the system, including but not limited to: Ethernet (or IEEE 802.3), SAP, SAS™, ATP, Bluetooth™, and TCP/IP. Further, in some embodiments, various communications protocols endorsed by the Gaming Standards Association of Fremont, Calif., may be utilized, such as (i) the Gaming Device Standard (GDS), which may facilitate communication between a gaming device and various component devices and/or peripheral devices (e.g., printers, bill acceptors, etc.), (ii) the Best of Breed (BOB) standard, which may facilitate communication between a gaming device and various servers related to play of one or more gaming devices (e.g., servers that assist in providing accounting, player tracking, ticket-in/ticket-out and progressive jackpot functionality), and/or (iii) the System-to-System (S2S) standard, which may facilitate communication between game-related servers and/or casino property management servers (e.g., a hotel server comprising one or more databases that store information about booking and reservations). Communication may be encrypted to ensure privacy and prevent fraud in any of a variety of ways well known in the art.

Those skilled in the art will understand that devices in communication with each other need not be continually transmitting to each other. On the contrary, such devices need only transmit to each other as necessary, and may actually refrain from exchanging data most of the time. For example, a device in communication with another device via the Internet may not transmit data to the other device for weeks at a time. In one embodiment, a server computer may not be necessary and/or preferred. For example, the present invention may, in one or more embodiments, be practiced on a stand-alone gaming device and/or a gaming device in communication only with one or more other gaming devices. In such an embodiment, any functions described as performed by the computer or data described as stored on the computer may instead be performed by or stored on one or more gaming devices.

Gaming Device

The gaming device may be implemented as a system controller, a dedicated hardware circuit, an appropriately programmed general-purpose computer, or any other equivalent electronic, mechanical or electromechanical device. The gaming device may comprise, for example, a slot machine, a video poker machine, a video blackjack machine, a video keno machine, a video lottery machine, a pachinko machine or a table-top game. In various embodiments, a gaming device may comprise, for example, a personal computer (e.g., which communicates with an online casino Web site), a telephone (e.g., to communicate with an automated sports book that provides gaming services), or a portable handheld gaming device (e.g., a PDA). The gaming device may comprise any or all of the gaming devices of the aforementioned systems. In some embodiments, a user device such as a PDA or cell phone may be used in place of, or in addition to, some or all of the gaming device components. Further, a gaming device may comprise a personal computer or other device operable to communicate with an online casino and facilitate game play at the online casino. In one or more embodiments, the gaming device may comprise a computing device operable to execute software that simulates play of a reeled slot machine game, video poker game, video blackjack game, video keno game, video roulette game, or lottery game.

The gaming device comprises a processor, such as one or more Intel® Pentium® processors. The processor is operable to communicate with a random number generator, which may be a component of the gaming device. The random number generator, in accordance with at least one embodiment of the present invention, may generate data representing random or pseudo-random values (referred to as "random numbers" herein). The random number generator may generate a random number, for example, every predetermined unit of time (e.g., every thousandth of a second) or in response to an initiation of a game on the gaming device. In the former embodiment, the generated random numbers may be used as they are generated (e.g., the random number generated at substantially the time of game initiation is used for that game) and/or stored for future use. A random number generated by the random number generator may be used by the processor to determine, for example, at least one of an outcome and payout. A random number generator, as used herein, may be embodied as a processor separate from but working in cooperation with the processor. Alternatively, the random number generator may be embodied as an algorithm, program component, or software stored in the memory of the gaming device and used to generate a random number. Note that, although the generation or obtainment of a random number is described herein as involving a random number generator of a gaming device, other methods of determining a random number may be employed. For example, a gaming device owner or operator may obtain sets of random numbers that have been generated by another entity. HotBits™, for example, is a service that provides random numbers that have been generated by timing successive pairs of radioactive decays detected by a Geiger-Muller tube interfaced to a computer. A blower mechanism that uses physical balls with numbers thereon may be used to determine a random number by randomly selecting one of the balls and determining the number thereof.

Of course, as would be understood by one of ordinary skill in the art, a random number generator may be stored in a device other than a gaming device. For example, in some embodiments, a gaming device may receive random numbers and/or any other data related to the random or pseudo-random determination of an outcome from a separate device, such as a server. It should be noted that such embodiments may be advantageous in environments or jurisdictions wherein the "central determination" of outcomes is required by regulation or otherwise preferred.

The processor may also be operable to communicate (e.g., via a protocol such as GDS) with various component devices associated with the gaming device, including but not limited to currency output devices, output devices, input devices and/or input/output devices.

In some embodiments, a currency output device may be a component of the gaming device. The currency output device may comprise one or more devices for outputting currency to a player of the gaming device. For example, in one embodiment the gaming device may provide coins and/or tokens as currency. In such an embodiment the currency output device may comprise a hopper and hopper controller, for dispensing coins and/or tokens into a coin tray of the gaming device. In another example, the gaming device may provide a receipt or other document on which there is printed an indication of one or more indicium (e.g., a cashless gaming ticket as is known in the art). In such an embodiment, the currency output device may comprise a printing and document dispensing mechanism. In yet another example, the gaming device may provide electronic credits as currency (which, e.g., may be subsequently converted to coins and/or tokens and dispensed from a hopper into a coin tray). In such an embodiment, the currency output device may comprise a credit meter balance and/or a processor that manages the amount of electronic credits that is indicated on a display of a credit meter balance. In yet another example, the gaming device may credit a monetary amount to a financial account associated with a player. The financial account may be, for example, a credit card account, a debit account, a charge account, a checking account, or a casino account (e.g., an account from which the player may access cashable and/or non-cashable funds using a player tracking card or smart card). Further, the gaming device may credit a benefit to an account, such as a frequent player account, associated with a player. In such an embodiment the currency output device may comprise a device for communicating with a server on which the account is maintained. Note that, in one or more embodiments, the gaming device may include more than one currency output device. For example, the gaming device may include both a hopper and hopper controller combination and a credit meter balance. Such a gaming device may be operable to provide more than one type of currency to a player of the gaming device. A single currency output device may be operable to output more than one type of currency. For example, a currency output device may be operable to increase the balance of credits in a credit meter and communicate with a remote device in order to increase the balance of a financial account associated with a player.

The processor may also be operable to communicate with various output devices. In some embodiments, an output device comprises a display device. The display device may comprise, for example, one or more display screens or areas for outputting information related to game play on the gaming device, such as a cathode ray tube (CRT) monitor, liquid crystal display (LCD) screen, or light emitting diode (LED) screen. In one or more embodiments, a gaming device may comprise more than one display device. For example, a gaming device may comprise an LCD display for displaying electronic reels and a display area that displays rotating mechanical reels. The display device may comprise, for example, one or more display areas. For example, one of the display areas (e.g., a primary game screen) may display outcomes of games played on the gaming device (e.g., electronic reels of a gaming device). Another of the display areas (e.g., a secondary game screen) may display rules for playing a game of the gaming device. Yet another of the display areas may display the currency and/or benefits obtainable by playing a game of the gaming device (e.g., in the form of a payout table).

The processor may also be in communication with one or more other output devices besides the display device, for outputting information (e.g., to a person or another device). Such other one or more output devices may also be components of a gaming device. Such other one or more output devices may comprise, for example, an audio speaker (e.g., for outputting an outcome or information related thereto, in addition to or in lieu of such information being output via a display device); headphones; an infra-red transmitter; a radio transmitter; an electric motor; a printer (e.g., such as for printing cashless gaming tickets); a dispenser for outputting pre-printed coupons, tickets or vouchers; an infra-red port (e.g., for communicating with a second gaming device or a portable device of a player); one or more universal serial bus (USB) ports; a Braille computer monitor; and a coin or bill dispenser. For gaming devices, common output devices include a cathode ray tube (CRT) monitor on a video poker machine, a bell on a gaming device (e.g., rings when a player wins), an LED display of a player's credit balance on a gaming device, an LCD display of a personal digital assistant (PDA) for displaying keno numbers.

The processor may also be in communication with one or more input devices, which may be capable of receiving an input (e.g., from a player or another device) and which may be a component of gaming device. Alternately or additionally, an input device may communicate with or be part of another device (e.g., a server, a gaming device, etc.). Some examples of input devices include: a bar-code scanner, an optical scanner configured to read other indicia of a voucher or cashless gaming ticket, a CCD camera, a magnetic stripe reader (e.g., for reading data encoded upon a player tracking card), a smart card reader (e.g., for reading data stored upon a smart card), a computer keyboard or keypad, a button, a handle, a lever, a keypad, a touch-screen, a microphone, an infrared sensor, a voice recognition module, a coin or bill acceptor, a sonic ranger, a computer port, a video camera, a motion detector, a digital camera, a network card, a universal serial bus (USB) port, a GPS receiver, a radio frequency identification (RFID) receiver, an RF receiver, a thermometer, a pressure sensor, an infrared port (e.g., for receiving communications from a second gaming device or from a another device such as a smart card or PDA of a player), and a weight scale. For gaming devices, common input devices include a button or touch screen on a video poker machine, a lever or handle connected to the gaming device, a magnetic stripe reader to read a player tracking card inserted into a gaming device, a touch screen for input of player selections during game play, and a coin and bill acceptor.

The processor may also be in communication with a payment system, which may be a component of the gaming device. The payment system is a device capable of accepting currency from a player (e.g., a wager or initiation of a balance) and/or providing payment to a player (e.g., a payout). Payment is not limited to money, but may also include other types of consideration, including products, services, and alternate currencies. Exemplary methods of accepting payment by the payment system include (i) receiving hard currency (i.e. coins or bills), and accordingly the payment system may comprise a coin or bill acceptor; (ii) receiving an alternate currency (e.g., a paper cashless gaming ticket, a coupon, a non-negotiable token), and accordingly the payment system may comprise a bar code reader or other sensing means; (iii) receiving a payment identifier (e.g., a credit card number, a debit card number, a player tracking card number) and debiting the account identified by the payment identifier; and (iv) determining that a player has performed a value-added activity (e.g., participating in surveys, monitoring remote images for security purposes, referring friends to the casino).

In some embodiments, a gaming device may comprise components capable of facilitating both input and output functions (i.e., input/output devices). In one example, a touch-sensitive display screen comprises an input/output device (e.g., the device outputs graphics and receives selections from players). In another example, a processor may communicate with a "ticket-in/ticket-out" device configured to dispense and receive cashless gaming tickets as is known in the art. Such a device may also assist in (e.g., provide data so as to facilitate) various accounting functions (e.g., ticket validation and redemption). For example, any or all of a gaming device, kiosk and casino personnel device maintained at a cashier cage may (i) comprise such a benefit input/output device, and/or (ii) communicate with a central server that manages the accounting associated with such ticket-in/ticket-out transactions (e.g., so as to track the issuance, redemption and expiration of such vouchers). One example of such ticket-in/ticket-out technology, the EZ Pay™ system, is manufactured by International Gaming Technology, headquartered in Reno, Nev.

Of course, as would be understood by one of ordinary skill in the art, a gaming device may comprise various combinations of such component devices. For example, in one or more embodiments, the gaming device may include more than one display device, one or more other output devices, several input devices, and so on (e.g., two display screens, two audio speakers, a ticket-in/ticket-out device and several buttons).

The processor may also communicate with a memory and a communications port (e.g., so as to communicate with one or more other devices). The memory may comprise an appropriate combination of magnetic, optical and/or semiconductor memory, and may include, for example, Random Access Memory (RAM), Read-Only Memory (ROM), a compact disc and/or a hard disk. The memory may comprise or include any type of computer-readable medium. The processor and the memory may each be, for example: (i) located entirely within a single computer or other device; or (ii) connected to each other by a remote communication medium, such as a serial port cable, telephone line or radio frequency transceiver. In one embodiment, the gaming device may comprise one or more devices that are connected to a remote server computer for maintaining databases.

The memory stores a program for controlling the processor. The processor performs instructions of the program, and thereby operates in accordance with the present invention, and particularly in accordance with the methods described in detail herein. The program may be stored in a compressed, uncompiled and/or encrypted format. The program furthermore includes program elements that may be necessary, such as an operating system, a database management system and "device drivers" for allowing the processor to interface with computer peripheral devices. Appropriate program elements are known to those skilled in the art, and need not be described in detail herein.

The term "computer-readable medium" as used herein refers to any medium that participates in providing instructions to the processor of the gaming device (or any other processor of a device described herein) for execution. Such a medium may take many forms, including but not limited to, non-volatile media, volatile media, and transmission media. Non-volatile media include, for example, optical or magnetic disks, such as memory. Volatile media include dynamic random access memory (DRAM), which typically constitutes the main memory. Transmission media include coaxial cables, copper wire and fiber optics, including the wires that comprise a system bus coupled to the processor. Transmission media may carry acoustic or light waves, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM or EEPROM (electronically erasable programmable read-only memory), a FLASH-EE- PROM, any other memory chip or cartridge, a carrier wave as described hereinafter, or any other medium from which a computer can read.

Various forms of computer readable media may be involved in carrying one or more sequences of one or more instructions to the processor (or any other processor of a device described herein) for execution. For example, the instructions may initially be borne on a magnetic disk of a remote computer. The remote computer can load the instructions into its dynamic memory and send the instructions over a telephone line using a modem. A modem local to a gaming device (or, e.g., a server) can receive the data on the telephone line and use an infrared transmitter to convert the data to an infrared signal. An infrared detector can receive the data carried in the infrared signal and place the data on a system bus for the processor. The system bus carries the data to main memory, from which the processor retrieves and executes the instructions. The instructions received by main memory may optionally be stored in memory either before or after execution by the processor. In addition, instructions may be received via a communication port as electrical, electromagnetic or optical signals, which are exemplary forms of carrier waves that carry data streams representing various types of information. Thus, the gaming device may obtain instructions in the form of a carrier wave.

According to an embodiment of the present invention, the instructions of the program may be read into a main memory from another computer-readable medium, such from a ROM. Execution of sequences of the instructions in program causes a processor perform the process steps described herein. In alternate embodiments, hard-wired circuitry may be used in place of, or in combination with, software instructions for implementation of the processes of the present invention. Thus, embodiments of the present invention are not limited to any specific combination of hardware and software. As discussed with respect to aforementioned systems, execution of sequences of the instructions in a program of a peripheral device in communication with the gaming device may also cause the processor to perform some of the process steps described herein.

The memory may store one or more databases described herein. Some or all of the data stored in each database is also described. The described entries of the databases represent exemplary information only; those skilled in the art will understand that the number and content of the entries can be different from those illustrated herein. Further, despite any description of the databases as tables, an object-based model could be used to store and manipulate the data types of the present invention and likewise, object methods or behaviors can be used to implement the processes of the present invention.

Where appropriate, a prior art probability database may be utilized in the performance of the inventive processes described herein. A probability database may be stored in the data storage device in tabular form, or any other appropriate database form, as is well known in the art. The data stored therein may include a number of exemplary records or entries, each defining a random number. Those skilled in the art will understand that the probability database may include any number of entries. The tabular representation may also define fields for each of the entries or records. The fields may specify: (i) a random number (or range of random numbers) that may be generated by the random number generator; and (ii) an outcome that indicates the one or more indicia comprising the outcome that corresponds to the random number of a particular record. A gaming device may utilize a probability database to determine, for example, what outcome corresponds to a random number generated by a random number generator and to display the determined outcome. The outcomes may comprise the three symbols to be displayed along a payline of a three-reel slot machine. Other arrangements of probability databases are possible. For example, the book "Winning At Slot Machines" by Jim Regan (Carol Publishing Group Edition, 1997) illustrates examples of payout and probability tables and how they may be derived. The entirety of this book is incorporated by reference herein for all purposes.

Further, where appropriate, a prior art payout database may be utilized in the performance of the inventive processes described herein. A payout database may be stored in the data storage device in tabular form, or any other appropriate database form, as is well known in the art. The data stored therein includes a number of example records or entries, each defining an outcome that may be obtained on a gaming device that corresponds to a payout. Those skilled in the art will understand that the payout database may include any number of entries. The tabular representation also defines fields for each of the entries or records. The fields specify: (i) an outcome, which indicates the one or more indicia comprising a given outcome; and (ii) a payout that corresponds to each respective outcome. The outcomes may be those obtained on a three-reel slot machine.

A gaming device may utilize the payout database to determine whether a payout should be output to a player as a result of an outcome obtained for a game. For example, after determining the outcome to output on the gaming device, the gaming device may access the payout database to determine whether the outcome for output is one of the outcomes stored as corresponding to a payout. If it is, the gaming device may provide the corresponding payout to the player.

Other arrangements of payout databases are possible. For example, the book "Winning At Slot Machines" by Jim Regan (Carol Publishing Group Edition, 1997) illustrates many examples of payout and probability tables and how they may be derived.

Additionally, where appropriate, a player database may be utilized to store historical data associated with specific players. A player database may be used, for example, to store wager data and player wager data so that players wagering over a given threshold in a given amount of time may be rewarded for their patronage. The player database may also contain other information that may be useful in, for example, promoting and managing player behaviors (e.g., information about the player's gaming preferences, gaming sessions, outstanding debts, lodging arrangements, and the like). Further, the player database may store data regarding a given player's standing in a game session or bonus game, so that the player can continue the game session or bonus game at a plurality of game machines that have common access to the player database. Such player data may be stored in a relational database and retrieved or otherwise accessed by the processor after receiving a "key" data point from the player, such as a unique identifier read from the player's player tracking card or cashless gaming ticket.

Note that, although these databases may be described as being stored in a gaming device, in other embodiments of the present invention some or all of these databases may be partially or wholly stored in another device, such as one or more of the peripheral devices, the peripheral device server, central server, kiosks, casino personnel devices, merchant POS terminals, and so on. Further, some or all of the data described as being stored in the databases may be partially or wholly stored (in addition to or in lieu of being stored in the memory of the gaming device) in a memory of one or more other devices, such as one or more of the peripheral devices, another gaming device, the peripheral device server and/or the server.

Gaming Device as Slot Machine

As discussed herein, in one or more embodiments the game device may take the form of a slot machine configured to operate in conjunction with the present invention. A more specific description of a slot machine suitable for use with the present invention follows.

A slot machine for use in the present invention may comprise, for example, a three-reel or five-reel slot machine. The slot machine comprises a display area in which an outcome for a game of the slot machine is displayed to the player. The display area may, for example, be a video display that displays graphical representations of reels. The display area may, in another example, be glass behind which are located mechanical reels. Within the display area is at least one payline. In accordance with one or more embodiments of the present invention, an outcome of a game is a set of symbols displayed along a payline of a reeled slot machine. The slot machine may further comprise a handle. A player may initiate the movement of the reels in the display area by pulling on the handle. Alternatively, a player may initiate the movement of the reels in the display area by actuating a start button or "spin" button. Either or both of the handle and start button are exemplary embodiments of an input device, described herein.

Where appropriate, the slot machine may also include an alternate, secondary game screen, for outputting information (e.g., payout information, outcome information, etc.) to a player. The secondary game screen may be utilized, for example, to inform a player of the player's standing in a game. The slot machine may be capable of altering display and audio content as described herein (e.g., superimposing graphics over digital displays; a mask layer between physical reels and a player that shades or otherwise alters their appearance).

The slot machine may also include a payment system, which is comprised of a bill acceptor, a credit card reader, a coin acceptor, and/or a ticket-in/ticket-out device. A player may utilize the payment system to provide a wager for playing a game and/or for providing payment for provision of an outcome.

The slot machine may further comprise a credit meter balance, which is an exemplary embodiment of a currency output device described herein. The credit meter balance reflects the amount of electronic credits currently available to a player. The electronic credits may be used by a player, for example, as wagers for games played on the gaming device. The electronic credits may also be "cashed out" as coins, bills, tokens, a cashout ticket, a cashout strip, and/or credits to another financial account associated with the player.

Finally, the slot machine may comprise a coin tray. Payment to the player may be rendered by dispensing coins into the coin tray. Such coins may be dispensed based on, for example, receiving a player's indication that the player would like to cash out his credit meter balance and/or a payout obtained by a player as a result of playing a game on the slot machine. The coin tray is an exemplary embodiment of the currency output device, described herein. Note that, where appropriate, the slot machine may include different and/or additional components besides those discussed in this section.

Player Tracking and Accounting

As described, in some embodiments, a gaming device may comprise a reader device for reading data from player tracking cards and/or smart cards, such that (i) players may be identified, and (ii) various data associated with players may then be determined (e.g., a number of cashable credits; a number of promotional credits that may not be redeemed for cash; a number of accumulated loyalty points; a number of accumulated game elements such as symbols, cards or hands; offers, benefits, benefits of offers, etc.). In one example, a card reader device may determine an identifier associated with a player (e.g., by reading a player tracking card comprising an encoded version of the identifier), such that the gaming device may then access data (e.g., of a player database, as described) associated with the player. In another example, a smart card reader device may determine data associated with a player directly by accessing a memory of an inserted smart card.

Thus, as known in the art, "smart cards" may incorporate (i) a memory, and (ii) means for accessing such a memory. For example, in one embodiment, the memory may store data related to aspects of the present invention. In one embodiment, data may be written to the smart card as a player plays one or more gaming devices (e.g., such that various data may be updated on a continuous, periodic or event-triggered basis). Accordingly, in one or more embodiments one or more devices operable to carry out various processes of the present invention (e.g., a gaming device or kiosk) may have associated therewith a smart card reader device, such that data may be read from the smart card pursuant to the execution of such processes. An example of a smart card system that may be used to implement one or more embodiments of the present invention is the s-Choice™ Smart Card Casino Management System from Smart Card Integrators, Inc.™.

Further, as known in the art, a gaming device may comprise a player tracking module comprising (i) a card reader (e.g., a port into which player tracking cards may be inserted), (ii) various input devices (e.g., a keypad, a touch-screen), (iii) various output devices (e.g., a small, full-color display screen), and/or (iv) combinations thereof (e.g., a touch-sensitive display screen that accommodates both input and output functions). Various commercially available devices may be suitable for such an application, such as the NextGen™ interactive player tracking panel manufactured by IGT or the iVIEW display screen manufactured by Bally® Gaming and Systems.

Of course, other non-card-based methods of identifying players are contemplated. For example, a unique identification code may be associated with the player. The player may then be identified upon entering the code. For example, the code may be stored (e.g., within a database maintained within the gaming device and/or a server) such that the player may enter the code using an input device of a gaming device, and accordingly be identified. In other embodiments, player biometrics may serve as identification means (e.g., a player is identified via a thumbprint or retinal scan). In further embodiments, a barcode of a cashout receipt may encode a player identifier.

Thus, as described, various data associated with a player may be tracked and stored (e.g., in an appropriate record of a centrally-maintained database), such that it may be accessed as desired (e.g., when determining promotional offers or rewards to be provided to players, when determining the status of player with respect to a particular game or period of gambling activity, and so on). Further, various statistics may be measured in association with a player (e.g., coin-in statistics, win/loss statistics) and similarly accessed.

Various systems for facilitating such monitoring are contemplated. For example, a two-wire system such as one offered by International Gaming Systems (IGT) may be used. Similarly, a protocol such as the IGT SAS™ protocol may be used. The SAS™ protocol allows for communication between gaming machines and slot accounting systems and provides a secure method of communicating all necessary data supplied by the gaming device to the online monitoring system. One aspect of the SAS™ protocol that may be beneficial in implementing aspects of the present invention is the authentication function which allows operators and regulators to remotely interrogate gaming devices for important memory verification information, for both game programs, and peripheral devices. In another example, a one-wire system such as the OASIS™ System offered by Aristocrat Technologies™ or the SDS slot-floor monitoring system offered by Bally Gaming and Systems™ may be used. Each of the systems described above is an integrated information system that continually monitors slot machines and customer gaming activity. Thus, for example, any one of these systems may be used to monitor a player's gaming activity in order to determine player outcomes, coin-in statistics, win/loss statistics and/or any other data deemed relevant.

Other Devices

In some embodiments, a kiosk may be configured to execute or assist in the execution of various processes of the present invention. In some embodiments, a kiosk may comprise a processor and a memory as described. A kiosk may also comprise various input devices (e.g., a keypad, a keyboard, a mouse, buttons, a port that receives player tracking cards, an optical scanner for reading barcodes or other indicia, a CCD camera, etc.), output devices (e.g., a display screen, audio speakers, etc.), currency output devices (e.g., a coin tray or printer for printing cashless gaming tickets), offer output devices (e.g., a printer for printing benefit receipts, coupons, certificates, etc.) combinations thereof (e.g., a "ticket-in/ticket-out" device, a touch-sensitive display screen, etc.), communications ports, and so on. Thus, a kiosk may comprise many of the features and components of a gaming device, though the kiosk itself may not necessarily be configured to enable gambling activity as a primary function. A kiosk may communicate with any or all of (i) a central controller, (ii) a gaming device, (iii) an inventory/reservation system of a casino-maintained property (e.g., a hotel), (iv) casino personnel devices, (v) merchant POS terminals, and so on. A number of kiosks may be stationed within casino premises (e.g., at various locations on a slot floor). In various embodiments, kiosks may execute or assist in the execution of (i) determining and outputting a player status or other types of data described herein (e.g., a kiosk receives a player tracking card, and outputs a number of accumulated rewards, offers or benefits which a player may be entitled to redeem), (ii) outputting payments to players (e.g., upon receipt of cashless gaming tickets, player tracking cards, smart cards, etc.), and/or (iii) any other process described herein. Thus, such a device may be configured to read from and/or write to one or more databases of the present invention. The memory of such a device may store a program for executing such processes.

In some embodiments, various casino employees may be equipped with or otherwise utilize one or more casino personnel devices, such as personal digital assistants (PDAs) or other computing devices (e.g., personal computer terminals). A casino personnel device may comprise various input devices (e.g., a keypad, a touch-sensitive display screen, a card reader, an infrared bar code scanner, etc.), various output devices (e.g., an LCD screen, printer, etc.), a processor, a memory and/or a communications port, as described herein with respect to other devices. In some embodiments, a casino personnel device may communicate with a gaming device, server, kiosk, peripheral device, and/or an inventory/reservation system of a casino-maintained property (e.g., a hotel). Thus, a casino personnel device may be configurable to, among other things, (i) read from and/or write to one or more databases of the present invention, (ii) assist in payments made to players (e.g., a representative "scans" a cashout receipt and determines a value associated with the receipt, and if the receipt is valid, provides a payment or benefit equal to the value), and/or (iii) execute or assist in the execution of various other processes described herein. The memory of such a device may store a program for executing such processes.

In some embodiments, various merchants (e.g., shops, restaurants, etc.) may utilize point-of-sale (POS) computer terminals to facilitate various processes of the present invention. For example, in some embodiments, a player may receive a cashless gaming ticket redeemable for an amount of currency. However, the ticket may alternately or additionally be redeemable for a benefit such as an amount of credit at a particular merchant location. Thus, in some embodiments, merchants may utilize POS terminals to redeem such vouchers or receipts. In some embodiments, such devices may be configured to read from and/or write to one or more databases of the present invention. Such POS terminals may thus comprise various hardware and software described herein with respect to other devices, and may communicate with (i) a central slot server, (ii) a gaming device, (iii) an inventory/reservation system (e.g., a computer terminal at a theatre communicates with an inventory database to determine a number of unsold seats for a certain event), (iv) a kiosk, and so on.

In some embodiments of the present invention, various component devices (e.g., any or all of the benefit output devices, output devices, input devices and/or input output devices described herein) may be embodied as peripheral devices. For example, such devices may not necessarily be components of a gaming device, though they may be configured in such a manner so as to communicate with one or more gaming device processors or any other devices described herein. For example, a peripheral device such as a large display device may be associated with a plurality of gaming devices, and thus may not necessarily be considered a component of any one gaming device. Further, in some embodiments, certain peripheral devices such as card readers may be interchangeable between gaming devices, and thus may be considered a component of a first gaming device while connected thereto, removed from the first gaming device, connected to a second gaming device, and so on. In other embodiments, various peripheral devices may never be considered a component of a particular gaming device. For example, in some embodiments, a peripheral device such as a USB-based portable memory device may store (i) one or more databases described herein, and/or (ii) a program for executing one or more process steps described herein. Such a peripheral device may then be utilized by casino personnel for upgrading/retrofitting existing gaming devices as described herein.

Process Steps

Following is a description of process steps to be performed by (i) a gaming device, (ii) a controller, (iii) devices operatively connected to gaming devices and/or controllers (e.g., retrofitted hardware devices), (iv) alternate payment redemption kiosks, (v) casino personnel or merchants (e.g., operating remote devices and/or POS terminals), and (vi) any combination thereof. Thus, although the following description discusses the steps as performed by a gaming device, it is contemplated that the steps may be performed by any combination of the devices and computers described herein. Additionally, it should be understood that the steps of the invention may be performed in any order, and thus are not limited to the order in which they are described.

According to an embodiment, a gaming device may (directly or indirectly) provide players with cashout receipts that are redeemable for a benefit, rather than for merely the credit balance in effect when a cash out is requested.

Generally, according to at some embodiments, a gaming device receives a wager for play of a gaming device, determines an outcome for play of the gaming device, and determines a payout amount based on the outcome and the wager, all in a known manner. The credit balance is adjusted by the payout amount. The gaming device also determines at least one benefit based on the balance, as described in detail herein. After receiving a request to cash out (e.g., from a player by the player pressing a "cash out" button), the gaming device outputs a cashout receipt that represents the cashout balance in addition to the one or more offers (that may be accepted rather than the player's credit balance). In other embodiments, the player may be presented with a menu after requesting a cash out, the menu providing the player with several options, including but not limited to: receiving currency based on a cashout amount, an offer for a benefit to be accepted in lieu of a cashout amount, an offer for a benefit to be accepted in lieu of a portion of a cashout amount and an offer for a benefit to be accepted in addition to a cashout amount.

One of ordinary skill will recognize that such an embodiment is particularly advantageous when the amount of credit (i) is greater than the initial cashout value (typically the credit balance), and/or (ii) is redeemable towards a benefit having significant "margin" (difference between cost to the seller and price sold for by the seller).

Thus, for example, where the credit balance is $45, an offer may be a $50 credit towards a particular hotel bill in lieu of receiving $45. If the player were going to purchase, or had already purchased, the particular hotel room, then the $50 credit would typically be more appealing to the player. Simultaneously, the prospect of providing a $50 discount to a player who was owed only $45 may be acceptable to a casino, especially if (i) the casino owned or operated the hotel, (ii) the hotel was reimbursed wholly or partially by the casino for the $50 discount, and/or (iii) the hotel was generally more inclined to sell rooms than it otherwise would be (e.g., the hotel was largely under-booked and had excess capacity).

According to some embodiments, a player may be required to accept or reject the offer before a cashout receipt is printed. In other embodiments, the cashout receipt may include indicia of both a currency value for which the receipt may be redeemed and one or more offers that may be accepted by redemption of the receipt in lieu of the cashout amount. In some embodiments, a cashout receipt may itself be redeemed for one of a plurality of values. For example, a particular cashout receipt may, at the players option, be redeemed for one of (i) the player's credit balance, and (ii) a benefit (or a selected one of several offered benefits). Thus, the player need not (but may) choose which option is more desirable until such time as he redeems the ticket. In such an embodiment, the ticket may bear indicia indicating the values for which the ticket may be redeemed. FIGS. 12A, 12B and 13 illustrates tickets that bears indicia indicating that the ticket may be redeemed for (i) $9.75, or (ii) a $15 Buffet Credit, or (iii) a $20 Spa Credit, or (iv) $25 Hotel Credit, or (v) $40 Show Credit.

It is contemplated that an offer may be output in many known manners, such as output via a graphical user interface on a (touch) screen of the gaming device. The player may then respond to the offer by choosing (e.g., with a key press) one of the options presented in the offer.

In some embodiments, an offer may (but need not) be triggered by the player choosing to cash out (e.g., by pressing a "cash out" button). Such an offer may alternatively or additionally be presented to a player at other times, such as when the player begins a gaming session, or when the player registers for a player tracking card or similar account.

Determination of a Cashout Amount—Step 1710

Referring to FIG. 17, in some embodiments, a gaming device player may indicate a desire to cash out a balance associated with a gaming device or otherwise terminate a game session. For example, after establishing an initial balance of 80 credits at a 25¢ denomination slot machine, a player may gamble for a period of time, losing 23 credits, and press a "Cash Out" button located on the machine's control panel. In such an example, a gaming device may determine a cashout amount to be 57 credits, or $14.25 (i.e., a determined cashout amount is equal to a gaming device credit balance at the time the cashout is requested).

In other embodiments, a player may not actively request a cashout. For example, a prepaid game session may terminate, leaving a player with a particular credit balance (i.e., a determined cashout amount is equal to a gaming device credit balance at the time the session ends). Apparatus and methods which, among other things, permit and enable various ways of providing contract play and game sessions such as prepaid or flat-rate play sessions, and which are appropriate for use in accordance with the present invention are disclosed in pending U.S. patent application Ser. No. 10/001,089, filed Nov. 2, 2001, entitled "GAME MACHINE FOR A FLAT RATE PLAY SESSION AND METHOD OF OPERATING SAME," the entirety of which is incorporated herein by reference for all purposes.

In further embodiments, a player may elect to cash out a number of credits (i.e., exchange credits for currency) that is less than an accumulated credit balance (e.g., a player wishes to cash out a few credits to tip a cocktail waitress, etc.). Apparatus and methods which, among other things, permit and enable gaming device players to cash out a portion of an accumulated credit balance, and which are appropriate for use in accordance with the present invention are disclosed in Applicant's U.S. Pat. No. 6,168,522, filed Mar. 31, 1998, entitled "METHOD AND APPARATUS FOR OPERATING A GAMING DEVICE TO DISPENSE A SPECIFIED AMOUNT," the entirety of which is incorporated herein by reference for all purposes.

Determination of an Offer—Step 1720

Referring to FIG. 17, after determining a cashout amount (discussed above with respect to step 1710), a gaming device may determine at least one benefit of an offer to be provided to a player based on one or more stored criteria/rules. For example, an offer type may be a "hotel offer" (e.g., an offer for a service available at a casino hotel property). An offer identifier or indicium (e.g., an alphanumeric code) may be associated with each offer (e.g., a particular hotel offer is "OF-000159"). Such criteria/rules may be stored in one or more databases accessible to a processor of a gaming device and/or central controller and may indicate whether an offer for a benefit should be made, a number of offers to be made, a value of a benefit of an offer, and the benefit or benefits of the offers.

An offer may be provided to the player to be accepted in lieu of currency based on the cashout amount, in lieu of a portion of currency based on the cashout amount or in addition to currency based on the cashout amount. For example, after determining a cashout amount to be 57 credits, or $14.25, the gaming device may provide an offer to be accepted or rejected by the player to receive a credit at a casino restaurant with a value of $20 in lieu of the $14.25 in currency.

Number of Offers to be Provided

As stated above, some embodiments may additionally comprise determining a number of offers to be included as part of a receipt or cashout strip. A variety of factors may be considered when determining a number of offers.

In some embodiments, the number of offers determined during step 1720 may be fixed. For example, a fixed amount of offers or alternate payout offers may be associated with every cashout (e.g., each cashout receipt must provide four offers). In another example, a receipt must comprise a specific number of offers, each of a particular type. For example, each cashout receipt must provide a hotel offer, a steakhouse offer, a Blackjack offer and two buffet offers. In further examples, a player may indicate a number of offers to be included as part of a receipt (e.g., when signing up for a player tracking card, using a touch-screen menu during a cashout process, etc.).

In other embodiments, the number of offers determined in step 1720 may be variable (i.e., at each request for a cashout, a variable number of alternate payout offers may be determined). In such an embodiment, the number of offers determined may be based on one or more of the factors, alone or in combination, including but not limited to: (i) cashout amount or balance associated with the gaming device (e.g., the higher the balance, the more offers presented on a cashout receipt, offer panel or portion of thereof), (ii) inventory/capacity considerations (e.g., if more casino properties are operating with excess capacity/inventory, more offers are output), (iii) player history/status (e.g., the more offers a player has accepted/redeemed historically, the more offers the player is shown), (iv) date/time (e.g., more offers are output on weekends than on weekdays), (v) win/loss amount (e.g., the more a player has won, the more offers provided to the player), (vi) buy-in amount (e.g., the more currency the player has inserted into a gaming device, the more offers a receipt or cashout strip comprises), (vii) speed of play (e.g., the faster a player plays, the more offers the player receives), and so on. Further, it is contemplated that the number of offers to be provided to the player may be based upon a hierarchy of any of the above factors (e.g., a cashout amount may be considered before a win/loss amount in determining the number of offers to be provided).

In further embodiments, a random number of offers is determined in step 1720 and provided to the player.

In some embodiments, the number of offers determined may be variable, but the number of offers determined for a particular cashout request may be restricted by a maximum. For example, in one embodiment, a maximum of 12 offers may be determined for a particular cashout request. In another embodiment, a minimum of three offers and a maximum of 12 must be determined. In such an embodiment, a gaming device may determine a number of offers according to a stored hierarchy as described herein. For example, a gaming device may consider a first preferred offer of twelve available offers. If the preferred offer is satisfactory (e.g., if the offer is a hotel room upgrade, the player must be a registered guest), the offer may be included. This process may continue such that all satisfactory offers are included (or, e.g., the first 12 satisfactory offers are included), leaving out any unsatisfactory or non-preferable offers.

Type of Offers to be Provided

Some embodiments may additionally comprise determining a type of offer or benefit of an offer to be included as part of a receipt. A variety of factors may be considered when determining a type of offer.

In one embodiment, a program stored in the memory of a gaming device (or, e.g., a central controller or kiosk) may instruct a processor to determine the same offer(s) in accordance with each cashout request. For example, a gaming device may determine to output a receipt comprising a "hotel offer" in accordance with each request for a cashout.

In some embodiments, an offer or offer type may be determined based on a cashout amount (which may be determined in step 1720). For example, if a cashout amount falls within a first predetermined range (e.g., $0.25 to $10), a first offer may be determined (e.g., "buffet offer"); if a cashout amount falls within a second predetermined range (e.g., $10.25 to $30), a second offer may be determined (e.g., "steakhouse offer"). Such conditions may be indicated in an offer determination database (an example of which is depicted in FIG. 4A).

In some embodiments, an offer may be determined based on an analysis of the inventory/capacity available at, e.g., one or more casino properties (e.g., shops, theatres, etc.). For example, a gaming device may communicate with one or more inventory/reservation systems maintained by a casino property. If it is determined that the property has sufficient, excess and/or under-utilized inventory/space, a rule may indicate to output an offer associated with the property. For instance, if only 50% of the seats have been sold for a comedy show scheduled to begin in the next 30 minutes, a "comedy show" offer may be determined (thus, the date/time associated with a particular event may also be considered).

Further, an offer may be determined in some embodiments by executing one or more profit management calculations, which may consider (i) retail prices and/or costs associated with the product or service, (ii) sales and inventory data associated with the product or service, (iii) a player's gambling activity or preferences, etc. Such methods for determining a product or service to offer to a casino player are described in Applicant's co-pending application, Ser. No. 09/570,335, entitled SYSTEM TO DETERMINE CASINO OFFERS, filed May 15, 2000, the entirety of which is incorporated by reference herein for all purposes.

In some embodiments, before a gaming session begins, a player may indicate one or more preferences for offer type. For example, in one embodiment, when signing up for a player tracking card (or otherwise registering for a casino loyalty program), a player may indicate which types of offers the player would be interested in receiving (e.g., when filling out a registration form, a player "checks off" a number of offer types, such that a casino representative may see that the preferences are recorded, e.g., in a player database, an example data structure of which is shown by FIG. 5). For example, a player who has indicated he does not like seafood (such data may be stored in a player database linked to a player tracking card) may not be presented to a seafood voucher as a payment option. A player vacationing at a Las Vegas casino may be presented with a payment option comprising an offer to switch his flight home to a different carrier.

In another embodiment, the first time an identified player (e.g., a player who has inserted a newly-acquired player tracking card) elects to cash out, a gaming device may provide the player with a preference menu (e.g., a touch-sensitive display device depicts several offer types that the player may choose), and the player's offer type preferences may then be received and considered during subsequent cashouts.

In further embodiments, each time a player indicates a desire to cash out, a gaming device may present the player with a menu of offers (e.g., "Which Bonus Offers would you like to see?"). The player may then select which offer he would like to be included as part of a particular receipt. In some embodiments, the player may view the value associated with a particular offer at this point (e.g., "$20 Steakhouse Credit!"). In other embodiments, the player may select an offer (e.g., "Steakhouse Credit"), the value of which may not be known to the player until a receipt prints.

In some embodiments, an offer type may be determined based a player's history. In one embodiment, an offer may be determined based on a previous offer the player has indicated interest in (e.g., the player previously selected a type of offer from a touch-screen menu). In another embodiment, an offer may be determined based on a previous offer the player has redeemed. In this manner, a system of the present invention may "learn" which offers a particular player (i) has an affinity toward, and/or (ii) is likely to redeem, such that these offers may then be provided to the player during subsequent cashout requests. Data regarding players' offer selections and redemptions may be stored in a player database described herein (e.g., see FIG. 5).

In another embodiment, an offer may be determined based on a player's status. For example, a player who has recently wagered a large sum of money playing Blackjack may be presented with a "Blackjack offer" next time he cashes out of a slot machine. In another example, a player who is a registered guest of a casino-maintained hotel may be presented with a hotel offer (e.g., an offer for a free room upgrade).

In one or more embodiments, an offer may be determined based on the offer's overall popularity offer with respect to other offers, as reflected by the redemptions of all casino players (e.g., offer are ranked in accordance with their acceptance rate, as described further herein).

In some embodiments, an offer may be determined based on the current date and/or time of day. For example, an offer determination database may indicate to output a "hotel offer" on Friday-Sunday, but a "buffet offer" on all other days (e.g., see FIG. 4B). Similarly, a "seafood lunch" offer may be output at a first time of day (e.g., before noon), whereas a "steakhouse dinner" offer may be output when a cashout occurs during a second time of day (e.g., after 1 p.m.).

In some embodiments, an offer may be determined based on the gaming device at which a cashout request is initiated. For example, a slot machine may be characterized by a particular theme (e.g., "Wild West Cash"). Offer types associated with such a machine may be thematically related (e.g., steakhouse offers).

In some embodiments, a "rules hierarchy" may function to determine an offer type when more than one rule/factor is in place. For example, a hierarchy may be established such that a first factor is considered when determining an offer type before a second factor. In one example, a casino may determine that steering a patron toward an under-utilized property (i.e., an inventory/capacity consideration) may be more valuable from a business standpoint than promoting a good or service a patron has shown an affinity toward in the past (i.e., player history/status). Thus, a gaming device (or, e.g., central controller) may first communicate with one or more inventory/reservation systems to determine a level of utilization/inventory. If a determined level is unsatisfactory (e.g., a theatre is less than 50% full, a shop has greater than 1,000 units of a particular product, etc.), the device may determine to output a "theatre offer" or the like. If a determined level is satisfactory, a device may then determine to output an offer based on player history/status (e.g., according to a criteria hierarchy stored in a database, an example of which is depicted in FIG. 6, "inventory/capacity" outranks "player history/status").

Additionally, in some embodiments, more than one offer may be of the same type. For example, turning to FIG. 7A, offer OF-000153 and offer OF-000154 may both be "hotel offers." It should be noted that, in some embodiments, step 1720 may comprise determining a particular offer (e.g., identified by a unique offer identifier). Thus, in some embodiments, step 1720 may comprise, (i) determining an offer type (e.g., a "standard offer" rule indicates that each receipt must comprise at least one "hotel offer"), and (ii) determining a particular offer (e.g., selecting a particular offer from an available list of hotel offers, e.g., depicted in FIG. 7A).

It should be noted that various criteria may be employed for selecting a particular offer when more than one offer of a particular type are available. For example, turning again to FIG. 7A, it may be preferable to offer a free room upgrade as a benefit of an offer. Thus, as a hierarchy may be established for selecting an offer, a hierarchy may also be established for selecting one of many particular offers of a certain type (e.g., when selecting a hotel offer, OF-000154 is preferable over OF-000153).

Continuing with the example, a gaming device may first consider offer OF-000154, but if such an offer is somehow unsatisfactory (e.g., the player requesting the cashout is not a registered hotel guest), an alternate offer may be selected (e.g., OF-000153). In other embodiments, a system of the present invention may employ only one offer of a particular type or category (e.g., one hotel offer, one steakhouse offer), as is demonstrated by an exemplary offer type database shown in FIG. 7B.

Value of Offer to be Provided

In addition to determining the number of offers to be provided, step 1720 may also comprise determining an offer value or a value of a benefit associated with an offer. A variety of rules/criteria for determining an offer value are imagined. It is contemplated that in some embodiments the value of a benefit of an offer should be greater than a balance associated with a gaming device at the time a request for a cashout is received. One of ordinary skill in the art will appreciate that determining a greater value of a benefit to be provided in contrast to cashout may induce a player to accept the offer.

In some embodiments, a standard value may be associated with an offer. For example, a fixed value associated with a "spa offer" may be a "Free Deluxe Facial Treatment—Retail Value of $20." In another example, a fixed value associated with a "buffet offer" may be $15. In another example, if a requested cashout amount is $40, a database may indicate to output the following four payment options: (i) a $60 dinner voucher, (ii) a $50 gift shop credit, (iii) a cash ticket for $42 redeemable at a later time (e.g., the following day), and (iv) $40 in cash/coins/ticket/tokens.

In some embodiments, a value associated with an offer may be based on a balance amount at the time of a request for a cashout. For example, a value associated with a "steakhouse offer" may always be 1.5 multiplied by a cashout amount (e.g., if a cashout amount is $15, the value of a steakhouse offer is $22.50). In some embodiments, a maximum and/or minimum value level may be associated with an offer. For example, a gaming device may multiply a $15 cashout amount by 1.5 to attain a steakhouse offer value of $22.50. If, however, a $20 maximum is associated with the steakhouse offer (e.g., as indicated by an offer value database, an example of which is shown by FIG. 8), the determined offer value may only be $20. In other words, when determining the value of a particular offer, a "ceiling" or "floor" may be considered.

In another embodiment, an offer value is calculating by adding a base dollar amount to a cashout amount (e.g., if a base amount is $5, and a cashout amount is $10, a determined value is $15).

In some embodiments, a value associated with an offer may be associated with an amount of winnings or losses incurred by a player, e.g., during a particular gaming session. For example, a player may play a 0.25¢ slot machine for a period of time and lose 125 credits (i.e., $31.25). An offer value may then be calculated as a function of the determined loss amount (e.g., the value of a "hotel offer" is "$62.50 in credit toward a stay in one of our guest suites!" or twice the loss amount).

In some embodiments, a value associated with an offer may be based on a buy-in amount (i.e., an amount of currency deposited by a player into a gaming device). For example, if a player approaches a slot machine and inserts an amount of currency (e.g., a $20 bill), a determined offer value may be a function of that amount (e.g., a "gift shop" offer has a value of "$30 in gift shop credit!", or 1.5 times the buy-in amount). It is contemplated that a value with an offer may be based on either an initial buy-in amount or a total amount of currency deposited by a player into a gaming device during the gaming session.

In some embodiments, a value associated with an offer may be based on a player's history or status. For example, if a player is a "gold level" slot club member, or has otherwise demonstrated a propensity to gamble large sums of money at a particular casino, a value associated with an offer provided to the player may be relatively high, compared to that of a player who, on average, generates less revenue for the casino. For example, a "steakhouse offer" may have a value of $30 for a "bronze level" player, whereas a "platinum level" player may receive a $50 steakhouse offer. In another example. A value associated with an offer may be based on a theoretical win metric associated with a player (e.g., the total amount a player has wagered at a casino multiplied by a house hold percentage associated with each wager). For example, a player who has generated a larger theoretical win metric (e.g., Player A has generated $1,350 in theoretical win, as opposed to Player B, who has generated only $357) may receive an offer characterized by a higher value.

In some embodiments, a value of a benefit associated with an offer may be based on the speed at which a player has played a particular gaming device. For example, a player who has recently completed a slot machine game session wherein he averaged 19 handle pulls per minute may receive an offer with a higher value (e.g., $20 in non-cashable Blackjack chips) than a player who averaged 12 pulls per minute (e.g., $15 in non-negotiable Blackjack chips). Apparatus and methods which, among other things, permit and enable gaming device players to achieve higher payout amounts based on a determined speed of play, and which are appropriate for use in accordance with the present invention are disclosed in Applicant's U.S. Pat. No. 6,238,288, filed Dec. 31, 1997, entitled "METHOD AND APPARATUS FOR DIRECTING A GAME IN ACCORDANCE WITH SPEED OF PLAY," the entirety of which is incorporated herein by reference for all purposes.

As explained above in reference to determining a number of offers to provide to a player, a hierarchy of criteria may be established for determining an offer value, such that one particular factor (e.g., cashout amount), may be considered before another (e.g., speed of play). Also, in some embodiments, a plurality of factors may be considered when determining an offer value. For example, an offer value may be determined by (i) determining a cashout amount (e.g., $12.75), (ii) determining a rate of play, (iii) determining a multiplier associated with the rate of play (e.g., 25 spins per minute earns a multiplier of 2), and (iv) multiplying the cashout amount by the multiplier (e.g., the offer value is $25.50).

It should be noted that in some embodiments, during step 1720, a gaming device may (i) determine a required offer value (e.g., if a cashout amount is $15, at least one $20 alternate payment offer must be included as part of a receipt), and subsequently (ii) select a particular offer based on the value (e.g., a $20 fixed-value hotel offer is selected).

In some embodiments, offers may be presented to a player so as to encourage a player to select an offer in lieu of a cashout. For example, if a player requests to cashout a $40 balance a gaming device may present a pair of offers designed to steer the player away from selecting a currency payout: (i) "$40 in cash," or (ii) "Two show tickets with a retail value of $60". Thus, a casino may promote an offer comprising a product or service with a retail value greater than a requested cashout amount, though the actual cost to the casino of providing the product or service may be less than the requested cashout amount, increasing the casino's profits if the option is selected. Meanwhile, players may perceive great value in acquiring goods and services at a discount relative to their cost through traditional sales channels. For purposes of example, groups of such payment options may comprise (i) A $9 cash payout or a magazine subscription, valued at $20; (ii) $100 in cash or a $150 American Airlines® voucher; and (iii) $43 in cash or dinner for two at the steakhouse (a $60 value).

In another embodiment, a player may be provided with a list of payment options, a monetary payout option appearing last in the list. For example, after requesting a $30 cashout, a player may see the following touch-screen menu (from top to bottom): "PICK YOUR PAYMENT FROM ONE OF: 1) $75 Gift Shop Voucher 2) Two Show Tickets (a $70 retail value) 3) Two Steakhouse Dinners (a $60 retail value) 4) $55 Cash Ticket."

It is further contemplated that after receiving a request for a cashout, a player may be provided with an offer in addition to some or all of a requested cashout amount. For example, after requesting a $100 cashout, a player may see the following touch screen menu (from top to bottom): "PICK YOUR PAYMENT FROM ONE OF: 1) $75 Gift Shop Voucher plus a $55 Cash Ticket 2) Two Show Tickets (a $100 retail value) plus a $40 Cash Ticket 3) Two Steakhouse Dinners (a $60 retail value) plus a $60 Cash Ticket 4) $100 Cash Ticket."

It is also contemplated that the value of an offer may be variable relative to an associated cashout amount. It can be advantageous if the value of the offer generally increases over time, since that would generally encourage continued play. For example, should a player request a cashout with a value of $20 and offer may be provided to the player for a $30 credit at the casino steakhouse in exchange for continuing play for an additional 5 minutes. Continuing, as the additional 5 minutes is about to elapse, the player may be made an additional offer with a value great than that of the initial offer in exchange for further continued play.

More specifically, the value of the offer can be based on a monotonically non-decreasing function of the time since the event. If the monotonically non-decreasing function is also not a constant with respect to the time since the event (i.e. if the value changes over time), then the function would render values of the value which (i) do not decrease with time, and also which (ii) increase over at least one predetermined period of time. In other words, during certain periods of time the value might not change, but when it does eventually change it can only increase. For example, the value of the offer may increase by $1 every hour of play since the start of the session.

In an embodiment where the benefit of an offer has a value that is based on a time since an event, it can be advantageous to display to the player, or otherwise inform the player, of the value and/or changes in the value. For example, a video display of the gaming device may display the current balance (e.g., $5) and values of offers (e.g., $7.80 redeemable towards food at participating casino restaurants, $15 redeemable toward casino property entertainment events such as shows and concerts).

When the player requests a cash out, the gaming device may output a confirmation prompt, such as "Are you sure you want to cash out?." It can be particularly beneficial to also indicate to the player an advantage to delaying cash out, such as with a message "Are you sure you want to cash out? Only ten more spins and you get double food points." Such confirmation may delay the cash out and/or encourage longer play by the player.

In an analogous manner, the value of a cashout receipt can increase over time, thereby encouraging players to delay redeeming their tickets. For example, a receipt may be redeemable immediately (e.g., for $16) or for more (e.g., for $17) if redeemed in one month. Moreover, the increase in value may continue (e.g., increase in value by $1, or by 0.5% each month). Such cashout receipts may indicate not only their value, but may also indicate the basis from which increases in value are calculated. For example, the receipt could indicate the starting date for calculating increases in value.

Receiving or redeeming a cashout receipt for an offer may be contingent on the player performing one or more specified activities, such as participating in a survey, or participating in a focus group.

In one embodiment, the player may receive the value of an offer provided he persuades a friend to buy a product, perform a task, or the like. For example, the player may be required to persuade a customer to sign up for a player tracking card. In such embodiments, the printed receipt may be accompanied by a player tracking card sign-up form that the player can provide to his friend. The sign-up card can have a code printed thereon that identifies the cashout receipt. Thus, when the card is turned in by the player's friend, the code can be recognized and then the offer may be activated for the player.

Similarly, a player can give a cashout receipt (or other indicator) to a friend, who may in turn redeem the receipt for its face value (e.g., $50). This redemption by the friend can provide an offer to the player (e.g., the value of the player's cashout receipt is increased). This added cost to the casino (of providing extra value to the player and value to the friend) may be an acceptable cost of acquiring a new customer (the friend). In such embodiments, cashout receipts could have (i) postage prepaid indicia on the reverse side, and/or (ii) a blank address field for the gift recipient's address. Cashout receipts may be provided in two parts (1) the player's ticket and (2) a gift portion to be given to a friend. Both portions may have a common code or indicia, associated codes, or other ways to link the two portions (e.g., in a database) enabling the player to be credited upon redemption by the friend.

In one embodiment, cashout receipts can expire (and thus be forfeited) if not redeemed by an expiration date (preferably printed on the ticket). This can encourage a return visit to a casino, hotel, etc. in order to redeem the ticket before it expires.

Determining Whether Offers Should be Provided

As stated above, it is also contemplated that a game device or kiosk may determine whether to provide an offer for a benefit to a player or whether a cashout request qualifies for an offer. For example, the gaming device may determine whether to output the offer based on at least one of, but not limited to, (i) at least one prior outcome (e.g., whether the player received a cherry-cherry-cherry outcome on a slot machine); (ii) a number of plays or outcomes generated; (iii) a buy-in amount (i.e., an amount of currency deposited by a player into a gaming device); (iv) one or more wager amounts (e.g., whether the player is wagering significant amounts); (v) a credit balance (e.g., whether the balance exceeds $500); (vi) a rate of play (e.g., whether the player has played at a rate of more than 100 hands of video poker per hour); (vii) an amount of losses (e.g., whether the player has wagered and lost more than $100 since the start of the gaming session); (viii) a number losing outcomes (e.g., whether more than half of the previous 50 outcomes were losing outcomes; whether there have been more than ten consecutive losing outcomes); (ix) a number pay lines selected (e.g., more than three pay lines selected), and (x) a time of a previous offer (e.g., whether there has been no offer in the last fifteen minutes of game play).

Similarly, the provision or receipt of offers may be restricted according to various criteria, such as those defined by stored rules. For example, in some embodiments cash out rules may provide that provision of alternate offers (or even just cashing out) may be permitted only (i) a limited number of times per predetermined time period, (ii) a limited number of times per predetermined amount won, (iii) a limited number of times per predetermined amount wagered, and/or (iv) a limited number of times per only gaming session. Such restrictions can promote longer play, or play with desired attributes (e.g., play with high wager amounts).

In some embodiments, rules for determining whether a cashout request is a qualifying request may be stored in a database in communication with a gaming device processor. A cashout request may qualify, for example, if (i) the requested cashout amount is greater than or equal to a certain threshold; (ii) the requested cashout amount is less than or equal to a certain threshold; (iii) the requested cashout amount falls within a certain range (e.g., between 50 and 400 credits); (iv) the requested cashout amount is a specific amount (e.g., 100 credits); (v) the length of a preceding gaming session exceeds a threshold (e.g., 15 minutes); (vi) the cashout request occurs at a particular time (e.g., between 5 and 11 p.m.) or (vii) the cashout request is made by a qualifying player. A gaming device may access player data to determine if a player is a qualifying player (e.g., a player tracking card points to a record in a player database stored on a central server).

A player may qualify based on certain criteria, for example, if the player is a registered hotel guest, the player's sex, the player is has visited the casino more than three times, etc.

Further, it is contemplated that a determination of whether to provide an offer may be based on a request for a cashout being received by a particular gaming device.

In some embodiments, if a cashout request is not a qualifying cashout request, a player may be presented with one payout option (e.g., a cashless gaming receipt with a face value equal to a gaming device credit balance, a number of coins, etc.).

Thus, upon receiving a request to initiate a cashout process, a gaming device may determine (i) whether an offer should be provided, (ii) a number of offers to be included as part of a receipt, (iii) at least one offer type, and (iv) at least one offer value. A variety of offer types are imagined.

Examples of Offers

For example, an offer may provide a player with either (i) credit toward food/drinks at a casino-maintained establishment (e.g., $20 in credit toward dinner at a steakhouse), or (ii)

one or more free items at a casino-maintained establishment, such that the items have a retail value substantially similar to the value determined in step 1720 (e.g., a receipt recipient may claim for free a "Surf & Turf" entree normally priced at $19.99). A variety of establishments are contemplated, including but not limited to restaurants, buffets, bars, food courts, etc. Exemplary "food & drinks" offers include, but are not limited to: "One free entrée at Seafood Sam's," "$15 in buffet credit," "2 free drinks with purchase of an appetizer," "Dinner for two at The Longhorn Steakhouse—up to $100 value!" and so on.

It is further contemplated that an offer may provide a player with either (i) credit toward a service provided by a casino-maintained hotel (e.g., $50 in credit toward any room), or (ii) one or more free hotel services, such that the services have a retail value substantially similar to the value determined in step 1720 (e.g., a cashout strip recipient may claim for free a "room upgrade" normally priced at $50/night). Exemplary hotel offers include, "$50 toward any room," "Free suite upgrade—$30 value!," "2 free on-demand movies at your room," "$15 mini-bar credit," "Breakfast in bed for two," etc.

It is also contemplated that an offer may provide a player with either (i) credit that may be applied to the purchase of one or more tickets for one or more live casino events (e.g., $50 in credit toward any comedy show), or (ii) free access to one or more events, such that the events have a retail value substantially similar to the value determined in step 1720 (e.g., a receipt recipient may redeem or exchange a receipt for free two cabaret tickets normally priced at $25 each). Exemplary live events include stand-up comedy, improvisational comedy, live musical performances, plays, Cirque de Soleil, magic acts, and the like.

In some embodiments, an offer may comprise credit toward a gambling activity provided by a casino. Exemplary gambling activities include the play of gaming devices (e.g., slot machines and video poker machines), table games (e.g., Blackjack, Texas Hold 'Em poker), keno, and so on. Exemplary "casino credit" offers include, but are not limited to: "15 free Keno plays," "Instant Slot Machine Bonus Round," "$20 in Poker chips," etc. It should be noted that, in this manner, a casino may encourage players to try new games, encourage repeated play, visit new areas of the casino, and so on. In some embodiments, the number of credits in such offer may be restricted to use at only certain types or categories of gaming devices or games. For example, the number of credits may be wagered only at gaming devices made by a particular manufacturer, only in particular games (e.g., video poker), or only at gaming devices which are branded a particular way (e.g., Monopoly®-branded gaming devices). Further, the designation of which categories of games/gaming devices and the number of credits available to be wagered may be variable (e.g., any gaming device bearing a red sign, any gaming device having a siren light which is illuminated).

In some embodiments, a player may exchange a current cashout (e.g., $14.50) for an offer comprising a larger amount of casino credit toward a gambling activity provided by a casino, so long as the gambling activity occurs at a later time/date (e.g., an offer is, "$20 in slot credit tomorrow"). In some embodiments, a player must play during a plurality of time periods in the future (e.g., instead of a $14.50 receipt, the player gets $5 in slot credit every day for the next four days). In some embodiments, an offer may comprise a stored value ("prepaid") card (e.g., slot card, phone card, gift card redeemable at a retail store). Such prepaid cards may expire, or have a balance that declines with time.

A player's agreement to visit a casino the following day may be very valuable to a casino, as they player may then gamble for an extended period of time, generating revenue for the casino. Apparatus and methods which, among other things, permit and enable gaming device players to attain benefits in such a manner, and which are appropriate for use in accordance with the present invention are disclosed in Applicant's U.S. Pat. No. 6,193,608, filed Dec. 31, 1996, entitled "METHOD AND APPARATUS FOR MOTIVATING PLAYERS TO RETURN TO A CASINO USING PREMIUMS," the entirety of which is incorporated herein by reference for all purposes.

In some embodiments, a player may be provided a plurality of payment options. For example, two payment offers may be provided from which the player may select: (i) a $50 cashless gaming receipt, or (ii) a $75 cashless gaming receipt, should the player agree to a purchase commitment (e.g., a future purchase at a particular retailer, a magazine subscription, etc.). Such methods are described in Applicant's co-pending application, Ser. No. 10/120,529, entitled METHOD AND APPARATUS FOR OFFERING FORWARD COMMITMENT AGREEMENTS, filed Apr. 10, 2002, the entirety of which is incorporated by reference herein for all purposes.

In some embodiments, an offer may provide a play with a receipt redeemable for (e.g., for free, at a reduced price, etc.) a gambling loss insurance policy. For example, a casino patron may redeem a $10 receipt for a policy normally priced at $15, such as "100% refund on all losses between $100 and $300 incurred today." Apparatus and methods which, among other things, permit and enable gaming device players to attain gambling loss insurance, and which are appropriate for use in accordance with the present invention are disclosed in Applicant's U.S. Pat. No. 6,113,493, filed Feb. 21, 1997, entitled "SYSTEM AND METHOD FOR GENERATING AND EXECUTING INSURANCE POLICIES FOR GAMBLING LOSSES," the entirety of which is incorporated herein by reference for all purposes.

It is also contemplated that offers may also provide complementary goods and/or credit redeemable at a variety of other establishments. Such establishments may include gift shops, spas, clothiers, jewelers, catalogs, etc. Exemplary offers include: "One set of Nike® golf clubs," or "$40 off one set of Nike® golf clubs," "Free leather jacket," "$50 in credit at P.W. Michaels' Jewelers," "One free deluxe facial treatment and massage," "One free comedy DVD," etc.

It some embodiments, a receipt or offer panel containing offer(s) for products and services may be redeemable at third-party merchants (merchants not affiliated with a casino property, e.g., Best Buy® or McDonald's®). For example, airline services (e.g., one domestic, round-trip flight), retail products (e.g., golf clubs), subscription services (e.g., a receipt or offer panel may comprise a prepaid magazine subscription card that may be filled out and mailed to the publisher or subscription fulfillment agent). Thus, a voucher may be redeemable for credit at a particular retailer or service provider, as opposed to a specific product or service. For example, a payment option may comprise a voucher for "$20 at Best Buy®" or "$40 Steakhouse Gift Voucher."

In some embodiments, the offer may comprise a chance to receive something. For example, the player may elect to receive a lottery ticket, such as a scratch-off lottery card. The scratch off lottery card may accompany, or be a part of, the cashout receipt. In an embodiment where the cashout receipt is part of the lottery ticket, the cash out value (e.g. the initial receipt value) may be printed above an opaque, removable (e.g., scratch off) portion, so that if the player chooses to accept the lottery ticket, the player is deemed to have forfeited the cash out value. In another embodiment, the receipt may provide an entitlement to enter a drawing (e.g., "Lotto" or "Powerball"). Ideally, once the drawing begins then the ticket may no longer be redeemed for the initial cash out amount. In one embodiment, the number of lottery entries (or the wager value of those entries) could be based on the "face value" of the ticket (the cash out amount).

In some embodiments providing offers may also comprise outputting one or more messages to a player. A message may be output via any output device described herein (e.g., display devices, audio speakers, etc.). Messages may be used to encourage the selection of a particular offer. For purposes of example, messages that may be output include: "Our steakhouse was rated #1 by *Las Vegas Magazine*!," "The gift shop features everything from poker books to cigars to t-shirts for family and friends!," "Fly Delta® and see the difference!," "Going to be here tomorrow? Get paid more to play!"

Thus, in this manner, offers may be constructed to accomplish a number of business goals, including: (i) reducing the number of cashless gaming tickets redeemed for their cash value, (ii) utilizing excess casino capacity (e.g., providing instead concert tickets that would not have sold anyway), (iii) keeping casino patrons on premises, or assuring they return at a later time/date, (iv) encouraging patrons to try new games (e.g., promoting new slot machines), (v) encouraging patrons to utilize other casino facilities such as restaurants, and so on.

Restrictions on Redemption

It should be noted that various restrictions may apply to an offer. For example, a restriction may specify that an offer may only be redeemed (i) during a certain time period, (ii) by a certain number of patrons, (iii) by a customer bearing certain identification (e.g., slot club member, a person over the age of 21, a person bearing an out-of-state driver's license), (iv) upon a qualifying purchase (e.g., an appetizer must be purchased to get two free drinks), etc. Such restrictions may, e.g., be described by text on any portion of a receipt.

In some embodiments, where the offer comprises an amount of credit towards a bill or account, the amount of credit may be subject to a ceiling (e.g., $50 towards a hotel room, not to exceed 80% of the hotel room's retail price). The amount of credit may be subject to usage restrictions (e.g., $5 off a restaurant bill, only for meals between 2:00 PM and 4 PM weekdays). Such usage restrictions may serve to increase revenues during certain times that would otherwise (or typically) have generated lower revenue.

Accordingly, it can be advantageous if the terms of offer, and/or restriction on their usage, are generated by or with a revenue management system and/or a hotel or airline reservation system, which manage prices towards particular goals (e.g., maximum profitability per time period). In particular, hotels, airlines, etc. can employ such offers to sell distressed (under-selling) goods/services, especially those which are perishable (cannot be sold well or at all as time passes), at a substantial discount without undermining their fare structures. For example, if certain players (e.g. players who have won more than a threshold amount, randomly selected players) are provided with offers, players will not be capable of accurately predicting discounts in prices of corresponding products or benefits.

Likewise, the terms of offers, and/or restriction on their usage, may be received by a third party (e.g., a server operating on behalf of a third-party merchant). In such embodiments, offers may be requested and/or received (in substantially real time) from one or more remote devices, such as computers operated by or on behalf of a third party.

Tracking Offer

In various embodiments, as stated above, providing a benefit associated with an offer may additionally comprise recording, logging or otherwise indicating that an offer has been redeemed or accepted. Such embodiments may ensure, e.g., that particular offers are not redeemed more than once. In some embodiments, this may be done electronically (e.g., when a kiosk scans a bar code, a field of a receipt database exemplified by FIG. 10 is updated to reflect that a particular offer has been redeemed). In another example, a merchant accepting offers may receive and store cashout receipts (or components thereof), such that redemptions may be logged at a later time. In other embodiments, a receipt or portion thereof may be altered during a redemption process, such that, e.g., all offers associated with the strip may then be considered invalid or void.

For example, a cashout receipt may comprise more than one portion (exemplified in FIG. 12A and FIG. 12B, depicting an offer receipt detachably connected to offer panels). For purposes of example, at a time when a players redeems a steakhouse offer, an employee of the steakhouse may (i) detach an offer panel from a cashout receipt (e.g., all offers on a panel may be considered void unless attached to a cashout receipt), (ii) punch a hole through a cashout receipt, offer panel or section thereof (exemplified in FIG. 14), (iii) tear off a portion of a cashout receipt or offer panel, and so on. Thus, no benefits may be provided if the offer panel is presented at a later time (e.g., a cashier recognizes that an offer panel is torn, etc.).

In another embodiment, a system of the present invention may (i) determine a number of times an offer or offer type has been presented (e.g., to date, 2,329 receipts have each presented one "hotel offer"), (ii) determine a number of times the offer or offer type has been redeemed (e.g., 107 patrons have redeemed a hotel offer), and (iii) determine an acceptance rate associated with the offer or offer type (e.g., 4.5% of all patrons shown the offer accepted the offer).

In further embodiments, and as will be discussed in further detail, an analysis may be done, e.g., to determine how popular a $10-$15 hotel offer is in relation to a $25-30 hotel offer. Offers may then be ranked in accordance with their acceptance rate. In this manner, a casino may test which offers are popular, such that those offers may be presented with greater frequency.

It should be noted that, in some embodiments, a player may have redeemed only one of several offers to which the player may have been entitled. For example, in one embodiment, a player may have only redeemed the first of "4 Free Buffet Dinners." Accordingly, the patron may be provided with an indication of the number of remaining goods/services the player may be entitled to receive (e.g., a buffet clerk checks off a box indicating that one dinner has been redeemed, though three unchecked boxes remain).

Output of Offers—Step 1730

Upon Bonus Round

In some embodiments, a player may be presented with a number of offers as the result of a bonus round. For example, a player may enter a bonus round after receiving a triggering outcome while playing a primary game of a slot machine. After a bonus round animation sequence is depicted on a display screen, the gaming device may then output to a player and offer such as: "Winner! Choose your Bonus Payment!—Option A: Buffet Dinner for Two (a $40 value), or Option B: 35 credits."

In some embodiments, a player may also choose to forego playing a bonus round in lieu of an offer.

It is also contemplated that in some embodiments a player may be presented with an offer at the conclusion of a bonus round; the offer to be accepted (i) in lieu of the payout based upon the outcome of the bonus round, (ii) in lieu of a portion of the payout based upon the outcome of the bonus round, or (iii) in addition to the payout based upon the outcome of the bonus round.

Determine Number of Cashout Receipts to Output

In some embodiments, after determining an offer to provide, offer value, and/or number of offers to be included as part of a cashout receipt, a gaming device may then determine a number of cashout receipts to be output. The number of receipts output during a cashout request may be based on a variety of factors. In some embodiments, the number is fixed. For example, only one cashout receipt may be output in accordance with every cashout, the receipt bearing indicia of both currency for which the receipt may be redeemed and at least one offer for which the receipt may be redeemed. In other embodiments, the number of cashout receipts output during step 1730 may vary based on one or more factors.

In one or more embodiments, a higher number of cashout receipts may be output if a cashout amount is larger. For example, a gaming device may divide a large cashout amount among several small-value receipts. Continuing with the example, a player may elect to cash out a balance ($37.25) from a gaming device. A gaming device may then output, for example, three cashout receipts, dividing the balance into three parts (e.g., a first cashout receipt comprising a receipt worth $20, a second cashout receipt comprising a receipt worth $10, and a third cashout receipt comprising a receipt worth $7.25). Thus, turning to FIG. 9, a database may indicate, dependent on a cashout amount, a number of cashout receipts to be output, as well as the value(s) of any associated receipt.

It should be noted that this may be beneficial for a variety of reasons. Specifically, as cashout requests will lead to the output of several fixed-value receipts (e.g., most cashouts will involve outputting a $10 receipt), fixed-value offers may be associated with such receipts (e.g., each $10 receipt provides a “$15 in buffet credit” offer). This may be beneficial as casinos can payment offers in a substantially predictable manner.

In some embodiments, the number of cashout receipts output may be based on the number of offers determined in step 1720. For example, in one embodiment, each cashout receipt may comprise no more than four offers. Accordingly, if more than four offers are determined in step 1720 (e.g., six offers are determined), any excess offers may be output as part of further receipts.

In some embodiments, a player may indicate the number of cashout receipts he/she would prefer to receive in accordance with a cashout request, as described herein.

As stated, in some embodiments, a cashout receipt may comprise at least two components, each of which will now be described in detail: (i) a cashout receipt, and (ii) an offer panel. In at least one embodiment, a cashout receipt and offer panel are part of the same strip of paper or substrate.

In one such embodiment, a cashout receipt and offer panel may be two contiguous sections of a long roll of paper, which may be output by a benefit output device as described herein, such as a printer. For example, a gaming device may store a roll of paper in conjunction with an ink-based or thermal printer (e.g., similar to those used by many merchants issuing point-of-sale receipts). During step 1730, a gaming device may actuate a printer mechanism to mark various text/indicia upon a portion of the roll. The roll of paper may be scrolled forward as the printing occurs, and in some embodiments, cut when the printing is finished, as is known in the art. For example, a gaming device may actuate a printer, such that (i) a cashout receipt and (ii) an offer panel are printed on the same roll of paper, which may then be cut or torn from a printing device by a recipient. Such an embodiment may be beneficial, as it would permit the output of cashout receipts having variable lengths.

In another such embodiment, a cashout receipt and offer panel may be detachable or separable from one another. For example, a gaming device may store a stack of fan-folded, 2.5"×6" sheets, attached to one another by perforation. Slot-Tickets.com™ of Memphis, Tenn. markets a variety of such paper sheets, which may be employed for purposes of the present invention. A cashout receipt may then comprise a number of 2.5"×6" sheets attached to one another. For example, as depicted by FIGS. 12A-12B, a cashout receipt may comprise a receipt, printed upon a first 2.5"×6" sheet, receipt being attached to several other 2.5"×6" sheets, which comprise offer panels. Each 2.5"×6" section of an offer panel may be thought of as an offer strip panel. Thus, as shown by FIGS. 12A-12B, a cashout receipt may comprise a number of panels (e.g., panels “A” and “B”), each offer panel comprising a number of offers (e.g., each panel comprises two offers).

In some embodiments, the number of offers per offer panel may be variable (e.g., based on the number of offers determined during step 1720). In other embodiments, the number of offers per offer panel may be fixed. Embodiments using perforated 2.5"×6" sheets may be preferable, as many existing slot machines feature technology (e.g., International Gaming Technology’s EZ Pay™ system) utilizing such sheets.

In further embodiments, the sections of a cashout receipt may be combined. For example, a cashout receipt and offer panel (or portions thereof) may occupy the same section or panel. Thus, in some embodiments, a cashout receipt may itself comprise a number of offers (e.g., see FIG. 13).

Thus, several variations of cashout receipt layouts are contemplated. Various embodiments of (i) cashout receipts and (ii) offer panels will now be discussed in more detail, in accordance with the use of perforated 2.5"×6" sheets (as stated, such embodiments may be preferable as they utilize existing technology).

A cashout receipt may in some embodiments closely resemble a “cashless gaming ticket” or “cashless gaming receipt” as known in the art. Thus, as stated, a cashout receipt may comprise a physical instrument (e.g., a small piece of paper) that may be output and/or received by a gaming device (e.g., via a “ticket-in/ticket-out” device), comprising (i) machine-readable indicia (e.g., a bar code), (ii) a unique receipt identifier (e.g., a series of numeric digits), and (iii) an indicated value (e.g., $32.75).

As stated above, a cashout receipt may entitle its bearer to a monetary amount or number of casino credits equal to the indicated value. For example, a player may have a balance of 70 credits after playing a 0.25¢ denomination slot machine for some time. Upon requesting to cash out, the player may be provided with a cashout receipt indicating a value of $17.50. The ticket may then be used to (i) establish a balance of 70 credits at a gaming device (e.g., the player inserts a cashout receipt output from a first machine into a second machine), or (ii) receive an equivalent amount of currency (e.g., the player visits a casino cage and is paid $17.50 in cash).

As stated, a cashout receipt may comprise machine-readable indicia, such as a barcode, and a receipt identifier that uniquely identifies the receipt. In some embodiments, machine-readable indicia may identify at least one of: (i) a player, (ii) the gaming device from which the cashout receipt was output, (iii) a value of currency for which the cashout receipt may be redeemed, (iv) at least one offer for which the cashout receipt may be redeemed, (v) the date/time at which the cashout receipt was output, (vi) terms or conditions upon which the receipt may be redeemed (e.g., expiration data or time windows). It is contemplated that a receipt identifier may comprise a numeric or alphanumeric code, such as "109583," alone or in combination with other machine-readable indicia.

In some embodiments of the present invention, a receipt identifier may be used to identify a cashout receipt, or may otherwise be thought of as a "cashout receipt identifier." For example, turning to FIG. 10, various data may then be associated with such an identifier, such as (i) a cash value a recipient may be entitled to, (ii) a player identifier associated with the recipient (e.g., identifying the player to whom the receipt was output), (iii), a time and/or date when the cashout strip was output, (iv) a number of offer identifiers associated with the cashout receipt, (v) an indication of whether or not any offers or cashout receipts have been redeemed, and/or (vi) an indication of whether or not any alternate payment offers or cashout tickets have expired.

As stated, in one or more embodiments, a cashout receipt may be attached by perforation to an offer panel (i.e., the offer panel and cashout receipt together comprise a receipt). Turning again to FIGS. 12A-12B, a cashout receipt may comprise four 2.5"×6" sheets output by a printer (although, a variety of such others are contemplated), each sheet being attached to the other by perforation. The final three sheets may comprise offer panels. Thus, players may detach and use a cashout receipt to obtain cash (e.g., by presenting the receipt at a change booth), credits (e.g., by inserting the receipt into a gaming device), benefits of offers (e.g., by presenting the receipt or offer pane; at a merchant location), etc., as the cashout receipt may be used to detail one or more offers.

In various embodiments, text and graphics appearing on an offer panel may be used to describe and/or promote an offer. For example, turning again to FIGS. 12A-12B, a "$15 Buffet Credit" alternate payment offer may be promoted on an offer panel. Text may describe the benefits associated with an offer as well as, e.g., redemption instructions. One or more graphics or icons may also be used (e.g., a "buffet" offer may comprise a picture of a buffet platter, an icon of a plate, etc.). An offer identifier may also be printed on an offer panel, e.g., in association with each offer (turning to FIG. 12A, a "$15 Buffet Credit" offer is identified by code OF-000598). Such an offer identifier may later be used, e.g., by a merchant, when redeeming an offer.

In another embodiment, a separate barcode may be printed in association with each offer, such that the barcode may be scanned during a redemption process (described further herein). Any number of offers may be described on an offer panel. Also, as stated, in some embodiments, a cashout receipt itself may comprise one or more offers (e.g., see FIG. 13). It should be appreciated that such text and graphics may be oriented in any manner.

Further, text printed upon a cashout receipt may also be used to describe (i) various redemption instructions associated with one or more offers, (ii) various redemption instructions associated with one or more meta-games detailed further herein, (iii) an expiration date associated with one or more offers, (iv) a date/time window during which one or more offers may be redeemed (e.g., Sunday, 1-4 p.m.), (v) other redemption restrictions, and so on. Such text may be printed upon the front and/or back of a cashout receipt.

Thus, as an offer and associated value/benefit may have been determined previously in step 1720, step 1730 may comprise determining various text or indicia to print upon a cashout receipt.

For example, turning again to FIG. 7A, once a gaming device has determined to include offer OF-000153, and determined a value associated with the offer (e.g., $15), a database (e.g., see FIG. 7A) may indicate text to be printed on a cashout receipt (e.g., the "offer description" associated with the offer is "Get $15 in Hotel Credit instead of your Cashout!"). As is known in the art, a printer may be calibrated such that text/indicia register correctly.

A cashout receipt may then be output by a benefit output device described herein (e.g., a "ticket-in/ticket-out" device). In this manner, a player requesting a cashout may be provided with a cashout receipt comprising a number of offers.

Receipt Redeemable by Third Parties

In some embodiments, an offer may enable a player to attain a benefit provided by an establishment that is not maintained, controlled, owned by or affiliated with the gaming device operator. For example, an offer may enable a player to receive credit at a major national retailer (e.g., Best Buy™, Wal-Mart™, etc.) or online merchant (e.g., Amazon.com). In such embodiments, additional accounting steps subsequent to the redemption of offers may be necessary.

For example, a player may gain $15 in credit for a purchase at Best Buy™ by redeeming an offer (e.g., a Best Buy™ employee processes the redemption request in a similar manner as described herein, providing the $15 in credit to the player/customer). Thus, as Best Buy™ may not be a casino-maintained property, the retailer may need to be compensated for providing such credit. Compensation may be provided in a manner that is well known in the art (e.g., Best Buy™ provides an audited list of redeemed offers and their associated values to a gaming device operator, which refunds the retailer accordingly).

In some embodiments, such compensation may not be necessary between casino-maintained establishments (i.e., whether a player is provided with credit at a slot floor or a casino-run restaurant may be immaterial, as revenues from both establishments contribute to the same bottom line). In other embodiments, further accounting/compensation interaction between such entities may be beneficial.

Offer May be Subsequently Changed

In some embodiments, a player may utilize a kiosk or gaming device to upgrade, exchange or add a number offers to those already indicated by a cashout receipt. For example, a player may approach a kiosk, insert a cashout receipt and view on a touch-screen display a menu of all the offers associated with the ticket. A player may then (i) upgrade offers (e.g., increase the value of a benefit associated with one or more offers), by accepting a sponsor offer, redeeming comp points, adding currency (e.g., currency and comp points may be traded at a specified rate of exchange to increase an offer value) or performing a value-added activity; (ii) add offers (e.g., the player selects a "Browse more offers" option), and/or (iii) exchange offers (e.g., the player identifies a spa offer he doesn't like and instead selects a hotel offer).

Additional offers a player may view and select (i.e., offers not originally included on a cashout receipt) may be determined based on a variety of factors as previously stated (e.g., cashout amount, etc.). For example, if a receipt comprises four offers, the player may later view at a kiosk the fifth- and sixth-ranked offers as indicated by a hierarchy, and so on.

In other embodiments, a player may use a kiosk and/or gaming device simply to browse details regarding one or more offers.

In some embodiments, a player may utilize a kiosk or gaming device to trade or upgrade elements (e.g., cards, game pieces) of a meta-game.

Formats of Cashout Receipts

In accordance with the disclosed embodiments, cashout receipts may include structure that permits various information to be conveyed, and/or permits various functionality to be realized.

For example, a receipt may be alterable (e.g., physically alterable). Such a receipt may include circles, ovals or check boxes which, when filled in, checked or otherwise registered (e.g., with a number 2 pencil) create machine-readable indicia.

receipt may include perforated portions allowing the ticket to be separated easily into different pieces or panels. The ticket may include an area which is altered by applying a sticker thereto, or by removing a sticker or scratch off material therefrom.

In some embodiments, in response to a request for a cashout, a gaming device may separately provide a cashout receipt and an offer panel (e.g., a receipt and offer panel are not attached by perforation to one another as described in some embodiments). For example, a gaming device may (i) print a cashout receipt from a benefit output device, and subsequently (ii) print an offer panel from the same benefit output device. In another example, a standard ticket-in/ticket-out device may be used to output receipts, but a gaming device may be configured to output offer panel via a separate (e.g., external) benefit output device (e.g., a gaming device communicates with a peripheral device, such as a small printer mounted on the side or top of a gaming device). In some such embodiments, when a player wishes to redeem an offer associated with an offer panel, the player may be required to present both the offer panel and associated cashout receipt.

As stated, in various embodiments, a gaming device may output (i) more than one cashout receipt, and/or (ii) a cashout receipt and separate offer panel (e.g., a separate receipt and panel are printed in sequence). Accordingly, in some embodiments, a gaming device may be configured to output a message to a player (e.g., via a display screen and/or audio speakers) indicating, e.g., that a player should wait to receive a number of additional printed items. For example, if a gaming device has determined to output two cashout receipt panels, while the first panel is printing, a display screen may be configured to read: "Please wait for your second receipt." In another example, if a gaming device has determined to output a cashout receipt followed by a separate, unattached offer panel, a similar message may be output while the cashout receipt is printing (e.g., "Please wait to receive another receipt with special bonus offers!").

In some embodiments, such a message described above may be output using a printer. For example, before a cashout receipt (or component thereof) is printed, a printer may be actuated to output a "message ticket." Text and graphics printed on such a ticket may indicate, e.g., "STOP! Three cashout receipts printing!" In another embodiment, a cashout receipt or component thereof may comprise such an indication (e.g., a first panel comprises text indicating that a second panel is about to print).

In other embodiments, various output devices (e.g., a display screen, speakers) may output a variety of other content during a cashout process. In some embodiments, such content may promote one or more alternate payment offers. For example, in one embodiment, while printing a cashout receipt providing a hotel offer, a gaming device may present a "virtual tour" of the hotel property using stored audio/video content (e.g., a display screen shows video footage taken inside a hotel suite, as audio speakers output a prerecorded narrative describing various amenities). In another example, if a cashout receipt comprises a restaurant offer, a display screen may show a picture of the restaurant's chef, and so on. In another embodiment, the video reels of a slot machine may depict an image of one or more cashout receipts or sections thereof.

In some embodiments, a cashout receipt may comprise a number of inactive offers. For example, an offer panel may comprise an inactive "$15 Steakhouse credit" offer, meaning that a player may not redeem such an offer without performing some specified "activating" action. A player may activate an inactive offer in a variety of manners, such as (i) signing up for a player tracking card, (ii) answering survey questions or performing some other value-added activity, (iii) booking a hotel room, (iv) trying new slot machines, and so on.

For example, a player may receive a cashout receipt indicating, "To activate a bonus offer, sign up for a Player's Club card." The player may then visit a slot club booth or other location to sign up for the card. A casino representative assisting the player may then also provide a benefit associated with an offer as described herein. Inactive offers may be indicated to players in a variety of manners (e.g., text reading "NOT ACTIVE" is superimposed over an offer, an offer is grayed out, etc.).

In some embodiments, an offer panel providing a number of inactive alternate payment offers may comprise an area for a player to fill in various information (e.g., name, address, etc.), such that the information may be used, e.g., when registering the player for a player tracking card. For example, a player may be able to fill out a separate 2.5"×6" sheet or panel, tear off the panel and provide it to a casino representative.

Meta-Games

A cashout receipt, offer panel, or component thereof may in some embodiments comprise a meta-game. A meta-game may enable a player to attain a benefit without wagering any additional credits or currency. Thus, in some embodiments, a player may attain a benefit associated with a meta-game in addition to attaining (i) a cash value associated with a cashout receipt, and/or (ii) a benefit associated with an offer. For example, a player may (i) attain a cash payout from winning a meta-game, and (ii) exchange a cashout receipt for currency at a casino cage. In other embodiments, a player must forfeit a cashout receipt and/or offer panel to play a meta-game (i.e., a meta-game entry is an offer). Instructions printed on a cashout receipt (e.g., on any side or component thereof) may indicate how to play a meta-game.

In some embodiments, a meta-game comprises a unique meta-game identifier (e.g., a series of numeric digits that uniquely identify a particular game entry), which may be indicated by a cashout receipt or component thereof (e.g., a bar code and/or numeric code are associated with a meta-game). In other embodiments, a cashout receipt identifier may be used to identify a meta-game entry. Benefits from playing meta-games may be provided by any or all of (i) a kiosk or gaming device (e.g., a player inserts a receipt, the kiosk scans a bar code to determine a meta-game identifier, the identifier points to a record in a database identifying a meta-game payout amount associated with the strip, and the amount is paid out via a benefit output device), (ii) casino personnel (e.g., who may determine payouts manually or electronically), and so on. A variety of meta-games are imagined.

In some embodiments, a meta-game comprises a poker theme. For example, a five-card poker hand may be printed on a cashout receipt. In one embodiment, a 2.5"×6" ticket attached to a cashout receipt comprises a poker-themed meta-game (e.g., a cashout receipt further comprises a separate "meta-game panel," as depicted by FIG. 16). In one such embodiment, a player requesting to cash out may be "dealt" five cards, which together comprise a poker hand (e.g., five cards are printed on a panel). The player may compare his hand to a pay table printed on the cashout receipt. The pay table may indicate any benefits (e.g., cash payouts) the player is entitled to if he possesses a certain hand (e.g., a "Royal Flush" pays $2,500).

In one embodiment, a player may combine a plurality of cashout receipts (or, e.g., meta-game panels) to create a hand in a poker-themed meta-game. For example, a player may be provided with a hand of A♥-8♥-J♣-10♦-2♣ on a first receipt and a hand of 6♥-5♥-J♥-K♦-3♣ on a second receipt. The player may then combine both receipts to create, e.g., a five-card hand of A♥-8♥-6♥-5♥-J♥. The player may then receive a payout for the flush. In some embodiments, a different pay schedule may be used for hands achieved using more than one cashout strip (e.g., a flush achieved using only one cashout receipt pays more than a flush achieved using two cashout receipts).

In some embodiments, a meta-game may comprise a game piece collection game. A player collecting a certain number or combination of game pieces may then be entitled to receive a benefit. For example, each cashout receipt may comprise a Monopoly® game piece (e.g., a "railroad property"). A player collecting four different railroad properties, e.g., may then be provided with a cash payout or other benefit. A variety of such game pieces are imagined. Embodiment providing meta-games may encourage players to retain cashout receipts rather than immediately redeeming them. In an embodiment, different game pieces or types of game pieces may be obtainable from different gaming devices or different games, thereby encouraging trial of, e.g., new gaming devices, new games. In some embodiments, a game piece may be uniquely identified (e.g., by a bar code and/or numeric code).

In other embodiments, a meta-game may comprise a lottery, sweepstakes, keno or bingo entry (e.g., a cashout receipt comprises a "scratch-off" element, numbers for a keno drawing, squares for a round of bingo, and so on).

In some embodiments, a player may use a kiosk or gaming device to save or store meta-game elements (e.g., cards, game pieces, etc.) in an electronic manner (e.g., a game piece identifier or meta-game identifier are stored in association with a player identifier). In this manner, a player may aggregate value over a period of time, motivating the player to continue game play within the casino.

In some embodiments, receipts may also represent a balance of "equity" points earned by the player that count toward a "meta game" or bonus game. For example, the player may have received 20 lemon symbols throughout the course of a gaming session. The lemon symbols may be provided on the receipt, so that the player can continue collecting the symbols as he tries to qualify for a special prize, collectible by redeeming the receipt.

Player Interaction with a Gaming Device

In the embodiments described herein, the player may interact with the gaming device (or another system) via one or more user interfaces (such as a graphical user interface) that are operable to receive at least one command from a player of the gaming device. For example, such a user interface may be provided before a cashout receipt is output, and the offer provided with or in lieu of a cashout amount may be based on one or more commands received via the user interface. Graphical user interfaces, including graphical buttons provided via touch screens, menus, etc., are well known in the art.

Such a user interface can allow a player to direct or modify attributes of a receipt. For example, in an embodiment in which the offer includes payment towards a bill (e.g., a hotel bill), the player may employ the user interface to apply the payment towards the bill, and the gaming device would then direct a computing device responsible for the bill payment to credit the bill in the specified amount. In such an embodiment, the receipt need not be redeemable for anything, but could merely be an indicium that evidences payment. Reconciliation of accounts may subsequently be applied (e.g., the casino might have to render the specified amount, or a portion thereof, to another entity).

A user interface may also be structured to allow a player to enter a code, such as the player's name, a PIN (personal identification number), password, thumbprint, retinal scan or the like, at a certain time (e.g., when the player requests to cash out, or requests an offer). Such a PIN, etc. could be registered with any receipt subsequently provided to the player. For example, the PIN may be recorded in a database record corresponding to the unique identifier that is printed on the cashout receipt. Thus, redemption of the receipt might require subsequent entry of the registered PIN, etc., or verification of the players name, in order to verify the identity of the player.

Similarly, gaming devices may include or be connected to a camera or other image capture device. Ideally, the image capture device is positioned to capture images that are proximal to the gaming device (e.g., an image of a player playing the gaming device). The gaming device may thus record an image of the player. The recorded image may be printed on the receipt and/or recorded in a database record corresponding to the cashless gaming ticket. In embodiments where the cashout receipt includes a printed image of the player, casino personnel (e.g. at the casino cage or coin booth) would be able to visually confirm the identity of player before accepting the receipt.

A user interface may also be structured to allow a player to select lottery numbers through the gaming device, and the lottery numbers can be printed on the cashout receipt as a form of offer, or in addition to other (conventional) payouts. The receipt thus can serve as a lottery ticket, and can entitle the bearer to winnings in a known manner.

A user interface may also be structured to allow a player to alter the value of a cashout receipt. For example, the user interface may allow the player to select an option to add money to increase the value of the receipt or offer. The player may add money by adding currency through the machine's bill validator or coin acceptor, swiping a credit card in a card reader, and the like. The user interface may allow a player to indicate when he has finished adding money and would like a receipt printed.

In one embodiment, a user interface may be structured to allow a player to generate a cashout receipt that represents only a portion of the player's credit balance (leaving the remainder of the credit balance available for play). For example, a player may choose to "round down" his credit balance to an even bill denomination, and generate a cashout receipt that represents the difference (e.g., to tip a waitress).

In some embodiments, a player may increase the value associated with (i) a cashout receipt (i.e., a cash value), and/or (ii) an offer. In various embodiments, a player may increase either value by accepting a sponsor offer or performing some other value-added activity (e.g., participating in a survey, etc.). Turning to FIG. 15, a sponsor offer may be explained and/or promoted on a cashout receipt and/or offer panel. A variety of parties, including but not limited to credit card issuers, phone service providers, membership clubs and magazine publishers may supply such offers, as many such parties would be wiling to pay a cash bounty to acquire a new customer (i.e., to such a party, the long-term value of acquiring a customer may be greater than a small bounty paid). For example, in one embodiment, a player may double a cash value associated with a cashout receipt by signing up for a credit card (i.e., accepting a sponsor offer). In another example, a player entitled to $15 in buffet credit (i.e., an offer for $15 in buffet credit) may instead receive $30 by agreeing to switch his/her phone service provider. A player may accept a sponsor offer in a variety of manners. In one embodiment, the player may call a phone number printed on a cashout receipt and provide a code (also, e.g., indicated by a cashout receipt), which may be associated with a particular offer. A casino representative may then be dispatched to assist the recipient in accepting the offer.

In another embodiment, the player may take the cashout receipt to a booth or other location where casino representatives may be stationed. Accordingly, a representative may then (i) process a sponsor offer indicated by the recipient (e.g., "I'd like to sign up for AT&T and get $30 in buffet credit"), and (ii) provide the indicated benefit to the player once the transaction is successfully processed (e.g., the representative provides a $30 buffet credit voucher). Processing a sponsor offer may comprise, but is not limited to: (i) identifying an offer (e.g., a player indicates an offer), (ii) receiving data from the player (e.g., name, address, credit card, etc.), (iii) transmitting data to a sponsor (e.g., a name and address are sent to a magazine publisher such that a magazine may then be sent to a player), (iv) providing a benefit, and so on. A representative may provide a benefit in a variety of manners, including: (i) issuing a voucher, (ii) crediting an electronic account associated with a player, (iii) directly providing a product, service and/or payout, and so on.

In some embodiments, a player accepting a sponsor offer may increase a value associated with a cashout receipt or offer by a standard or predetermined amount. For example, accepting a sponsor offer may (i) multiply a value associated with a cashout receipt or offer by a predetermined factor or multiplier (e.g., "Sign up for Sprint™ and get double hotel credit!"), and/or (ii) increase a value associated with a receipt or offer by a predetermined amount (e.g., "Apply for a Discover™ card and get an extra $10 cash!"). In other embodiments, accepting a sponsor offer may multiply or increase a value by a variable amount, factor or multiplier (e.g., a monetary amount within a certain range, etc.).

In some embodiments, a sponsor may agree in advance to pay a casino a bounty value for each customer attained. A bounty value may be a specific monetary amount (e.g., Columbia House will pay $15), or any monetary amount within a certain range (e.g., AT&T will pay a minimum of $0 and a maximum of $30 per customer). Such information may be stored in a database accessible to a gaming device (e.g., see FIG. 11). Accordingly, in response to a cashout request, a gaming device may (i) determine a cash value (e.g., $4) and/or offer value (e.g., "$15 in buffet credit"), and (ii) determine at least one sponsor offer based on the value. For example, a sponsor offer rule (e.g., stored in a database in communication with a gaming device) may indicate to provide a "2× Multiplier Offer" in association with (i) a cashout receipt, and (ii) every offer of a cashout receipt or panel. Thus, a gaming device may access a sponsor offer database (e.g., FIG. 11) to determine an acceptable sponsor offer to be associated with, e.g., a cashout receipt (e.g., an $8 "Sports Illustrated" sponsor offer is associated with a $4 receipt) and an offer (e.g., a $15 "Columbia House" sponsor offer may be used to double the value of a "$15 in buffet credit" offer), in accordance with the rule. A variety of such rules are imagined. Several exemplary sponsor offer rules include: Associate both a "2× Multiplier" and a "3× Multiplier" sponsor offer with a cashout receipt; Associate a "2× Multiplier" sponsor offer with a first offer and a "3× Multiplier" sponsor offer with a second offer; Associate a "2× Multiplier" sponsor offer with a first offer and an "Add $5" sponsor offer with a second offer.

In some embodiments, a value associated with a sponsor offer may be based on a loss amount. For example, a slot machine player may play for a period of time, and lose $16.75. A cashout receipt may then offer the player: "Get your money back! Choose a sponsor offer to get $16.75 cash!"

It should be noted that similar methods for determining sponsor offer types, a number of sponsor offers to be output, the value of one or more sponsor offers, etc., have been described previously with respect to offers; such methods may also be applicable to sponsor offers. For example, a hierarchy may indicate that a particular sponsor offer is preferable. However, a fixed bounty value associated with the sponsor offer (e.g., $5) may prevent the sponsor offer from being output based on (i) a determined cash value and/or offer value, and (ii) a sponsor offer rule (e.g., if a cash value is $10 and a sponsor offer rule indicates to associate a "2× Multiplier" sponsor offer with a cashout receipt, the $5 bounty associated with the preferred sponsor offer may be too small). Accordingly, a gaming device may then consider a second sponsor offer in the hierarchy, and so on.

In some embodiments, sponsor offers may be based on player history and/or preferences. For example, in one embodiment, a player may indicate which sponsor offers the player may be interested in seeing using a touch-screen menu of a kiosk. In another embodiment, a system of the present invention may ascertain which sponsor offers a player is likely to accept based on the player's previous redemption behavior, and may output sponsor offers accordingly.

Apparatus and methods which, among other things, permit and enable players to attain benefits by performing value-added activities and accepting sponsor offers, and which are appropriate for use in accordance with the present invention, are disclosed in Applicant's co-pending U.S. patent application Ser. No. 10/120,529, filed Apr. 10, 2002, entitled "METHOD AND APPARATUS FOR OFFERING FORWARD COMMITMENT AGREEMENTS," as well as U.S. patent application Ser. No. 10/121,243, filed Apr. 11, 2002, entitled "METHODS AND SYSTEMS FOR FACILITATING GAME PLAY AT A GAMING DEVICE BY MEANS OF SPONSOR OFFERS"; the entirety of both are incorporated herein by reference for all purposes.

Alternate Value for Offers

As stated, in some embodiments, a player may attempt to redeem an invalid alternate payment offer. For example, player may visit a steakhouse only to realize that a "$15 Steakhouse credit" offer may only be redeemed during a later time of day (e.g., the player arrives at 2 p.m., but the offer may not be redeemed until after 7 p.m.). In such embodiments, the player may be offered a substitute offer, such that the player does not leave disappointed. In one example, a merchant may access a predetermined list of such substitute offers using a merchant computer terminal. In another example, a kiosk may be programmed to present such substitute offers (e.g., "Sorry, that offer has expired. Would you like $5 in buffet credit instead?").

In one or more embodiments, a cashout receipt recipient may be able to gamble the value associated with one or more offers. For example, before a cashout receipt prints from a gaming device, the device may prompt a player: "Want double or nothing on your buffet credits? Press 'Yes' to play." An outcome may then be determined in a random manner and presented to the player (e.g., an animated wheel spins and lands on "Double!"). Should the player succeed in increasing the value associated with one or more offers, the player may then be provided with a cashout receipt or offer panel indicating the increased value.

In some embodiments, an offer may comprise a generic casino credit that may be used by a player at a number of specified casino locations. For example, a player may, instead of $23.75 cash, accept a "Casino Gift Card" with a balance of $30. The card (e.g., a plastic debit card similar to a "gift card," as known in the art) may then be used at a variety of locations within the casino property (e.g., food court, gift shop, etc.) to purchase goods/services. In this manner, players may enjoy experiencing a variety of benefits, rather than, e.g., selecting an offer redeemable at only one location. In further embodiments, a player may use a player tracking card as a "casino gift card."

In one or more embodiments, during a request for a cashout, a player may only be provided with a cashout receipt. A display screen may then instruct the player: "Trade your cashout ticket for more credit at one of our establishments! Visit a 'Trade-Up' kiosk or the Player's Club booth for details!" The display screen may also depict a variety of sample offers. Thus, the player may then provide the cashout receipt to, e.g., a kiosk or casino employee, such that the player may be provided with a number of offers some time after cashing out from a gaming device.

In another embodiment, a cashout receipt or offer panel may provide a "mystery offer," which may not be revealed to a player until a later time (e.g., until the player inserts the cashout ticket into a kiosk).

In one embodiment, a player may combine a plurality of similar offers culled from a number of cashout receipts. For example, a player may use a "$10 buffet credit" offer from a first receipt or offer panel and a "$15 buffet credit" offer from a second receipt or offer panel to receive $25 in buffet credit. In some embodiments, a casino may even motivate such behavior by providing a greater value to such a player (e.g., the player receives the $25 in credit, plus $5 in bonus credits). In other embodiments, offers may not be combined.

In one or more embodiments, the value associated with an offer may increase or decrease over time. Such embodiments may be used to encourage players to redeem certain offers or visit various properties during certain times.

In some embodiments, a player may redeem an offer using a home computer. For example, a player may access a Web site indicated by a receipt, enter a code associated with an offer and receive a good or service (e.g., a product is shipped to the player).

Redeeming a Cashout Receipt—Step 1740

Generally

Referring to FIG. 17, a cashout receipt, offer panel (or a component thereof) may be received from a player as part of a redemption process (e.g., a customer wishes to accept an offer, and thus provides a cashout ticket to a merchant). One of ordinary skill will recognize receiving to include, but not be limited to, receiving or obtaining a physical cashout receipt (or portion thereof), and receiving an indication of indicia or information printed on a cashout receipt (or stored thereon).

Thus, in some embodiments, redeeming a cashout receipt comprises receiving a physical substrate. In other embodiments, receiving a cashout strip may comprise (i) receiving the entire cashout receipt (i.e., a cashout ticket as well as any offer panels, or (ii) receiving an offer panel (e.g., a player tears an offer strip from a cashout ticket) (iii) receiving a code or computer-readable indicia (e.g., a bar code or cashout receipt identifier).

In one example, a player bearing a cashout receipt may tear off a cashout receipt that was once attached by perforation to an offer panel (e.g., the first of four 2.5"×6" sheets is torn). The receipt may then be received by (i), a redemption kiosk, (ii) a casino representative (e.g., a clerk at a slot club booth), (iii) a merchant (e.g., a restaurant host), and/or (iv) a gaming device.

At a Redemption Kiosk

In some embodiments, a cashout receipt (or, as described, a component thereof) may be received by a redemption kiosk. As stated, a kiosk may be a device configured to, among other things, (i) accept cashout receipts, (ii) provide benefits, (iii) book reservations as requested by players (e.g., at a restaurant or hotel), (iv) enable the purchase of a good and/or service (e.g., a patron accesses a merchant Web site), (v) view, exchange, select or upgrade offers, and so on. Accordingly, a casino patron may insert a cashout strip (or, e.g., cashout ticket), such that it is received by a kiosk (e.g., a player tears a 2.5"×6" cashout ticket, and inserts the ticket into a ticket-in/ticket-out device of a kiosk).

By a Casino Representative

In some embodiments, a cashout receipt may be received by a casino representative. Representatives may be stationed at a variety of locations throughout a casino. Exemplary representatives include, but are not limited to: (i) a change person making rounds on the slot floor, (ii) a clerk at a cash cage, (iii) an attendant at a "player's club" booth or, e.g., a registration center for player tracking cards, (iv) a casino employee directed to approach one or more players, and so on.

By a Merchant

In some embodiments, a merchant may receive a receipt and/or offer panel. For example, a player may posses a cashout receipt providing an offer reading, "$20 Steakhouse Credit instead of your Cashout amount." The player may then visit the steakhouse establishment, and present the cashout receipt to a host or clerk. Alternately, the player may present the cashout receipt when a purchase is finalized (e.g., the player tenders the cashout receipt much like a gift certificate once a bill is received).

By a Gaming Device

In some embodiments, a cashout receipt, or component thereof, may be received by a gaming device. For example, a player may posses a cashout receipt providing an offer reading, "$15.00 slot credit tomorrow instead of $12.50 today." The player may then detach the cashout receipt the following day, inserting it into a ticket-in/ticket-out device of a slot machine.

Determining Offer at Redemption

Once a cashout receipt (or component thereof) has been received, at least one accepted offer may be determined. A player may identify, select or otherwise accept an alternate payment offer in a variety of manners.

In various embodiments wherein a cashout receipt has been received by a redemption kiosk or gaming device, an offer may be identified in a variety of manners. In one or more embodiments, before inserting a cashout receipt (or, e.g., a component thereof), a player may mark, tear, punch out, fill in, or otherwise alter a selection area (e.g., a box) associated with one or more offers (e.g., as depicted by FIG. 14). Instructional text may appear on the cashout receipt describing that a player may indicate a particular offer by, e.g., filling in a box with a writing instrument. Thus, when the cashout receipt or offer panel is received, an optical scanner and/or camera within the kiosk or gaming device may determine that a particular offer has been selected (i.e., a particular selection area has been altered) as is known in the art. In other embodiments, a player may (i) insert a cashout receipt into a kiosk, and (ii) identify one or more offers using an input device, such as a touch-sensitive display screen. For example, a player may insert a cashout receipt into a kiosk, and the kiosk may then (i) determine a cashout receipt identifier (e.g., by scanning a bar code), (ii) determine any offers associated with the cashout receipt (e.g., by accessing a cashout receipt database as depicted by FIG. 10), and (iii) output the associated offers on a display screen.

For example, a player inserting a cashout receipt into a kiosk or gaming device may be presented with a menu of associated offers. The device may additionally output a message, such as text reading, "Please choose the offer you would like to redeem," or, e.g., an audio prompt indicating similar instructions. The player may then select an offer by, e.g., touching a portion of a display screen, pressing a particular button, and so on.

In various embodiments wherein a cashout receipt has been received by a casino representative or merchant, an offer may be identified in a variety of manners. For example, before handing the receipt to the representative or merchant, a player may identify an offer by altering a selection area as described above. In another embodiment, a patron may tear off a section of a receipt comprising an offer or offer panel; and hand the offer to a representative or merchant. For example, each 2.5"× 6" sheet of an offer panel may comprise one offer. Thus, a recipient may tear off one sheet and hand it to a representative or merchant. In another embodiment, a recipient may indicate verbally to a representative or merchant a desired offer.

It should be noted that, in various embodiments, receiving a selection of an alternate payment offer may comprise receiving a PIN code, initials or other player identifier. Such embodiments may be beneficial in alleviating any regulatory concerns associated with players exchanging monetary value for an alternate type of value (e.g., the player has personally verified a desire to exchange cash for an alternate payment offer).

Offer Validity Determined at Redemption

Once an accepted offer has been received (e.g., a player provides a cashout receipt or panel and indicates an offer he/she would like to redeem), a gaming device, kiosk, casino representative and/or merchant may determine whether or not the offer is valid. A redemption request for an offer may be considered invalid if, e.g., (i) the offer has expired, (ii) the offer has been previously redeemed, and/or (iii) a cashout receipt associated with the offer has been used (e.g., the player reinserted the cashout ticket into a slot machine and initiated a game play). Thus, to determine whether or not an offer has expired, a casino representative and/or merchant may either, (i) check an expiration date printed on the receipt that is associated with at least one offer, and/or (ii) use a cashout receipt identifier to determine an expiration date electronically (e.g., turning to FIG. 10, a merchant scans a bar code associated with a cashout receipt identifier 110782, and a cashout receipt database is queried to reveal, e.g., via a display screen of a merchant computer, that the cashout strip has expired). A gaming device or kiosk may also determine expiration data by, e.g., scanning a bar code and accessing a database. It should be noted that expiration data may describe (i) whether or not a cashout receipt expired, thus invalidating any associated offers, and/or (ii) whether or not a particular offer has expired (e.g., turning to FIG. 10, offer OF-000220 of ticket 109583 may have expired, but other offers may still be valid).

A casino representative and/or merchant may determine whether an offer and/or cashout receipt have been previously used or redeemed in a variety of manners, including but not limited to (i) determining whether the cashout receipt or offer panel has been altered in a particular manner (e.g., a cashout receipt has been separated from an offer panel, a hole has been punched through a cashout receipt or the receipt has been torn or ripped, thus voiding one or more offers), (ii) using a bar code and/or cashout receipt identifier to electronically determine whether or not the cashout receipt or offer in question has been redeemed (e.g., a merchant enters a cashout receipt identifier using a computer keyboard, and a computer screen displays redemption data, such as "INVALID: Credit already used").

Similarly, a gaming device or kiosk may scan the bar code of an inserted cashout receipt (or, e.g., offer panel), determine a cashout receipt identifier and determine redemption data. It should be noted that redemption data may describe (i) whether or not a cashout receipt has been used or redeemed for cash, thus invalidating any associated offers, and/or (ii) whether or not a particular offer has been redeemed.

Providing a Benefit Associated with an Offer—Step 1760

Referring to FIG. 17, once it has been determined that a selected offer is valid, a benefit associated with the offer may be provided. A variety of benefits may be provided in a variety of manners, depending, e.g., on the manner in which a cashout strip is received during step 1740.

Via Casino Representative

For example, a casino representative (e.g., a casino employee stationed on a casino slot floor) may provide a benefit in a variety of manners. In some embodiments, a representative may indirectly provide a benefit. For example, a representative may be equipped to (i) process an offer redemption request (e.g., receive a cashout receipt and determine whether or not an accepted offer is valid), and (ii) provide a voucher for a product/service indicated by the offer. For example, a patron bearing a cashout receipt may flag down a casino representative on a slot floor, hand the representative a receipt and say, "I'd like to get these steakhouse credits instead of my cashout receipt." In some embodiments, the representative may be equipped with a remote device, such as a personal digital assistant (PDA). As described, a remote device may be equipped with software to facilitate the redemption of alternate payment offers, as well as a communications link (e.g., via a wireless network) to a central controller, inventory/reservation system, or the like.

Continuing with the example, the representative may then (i) determine if the steakhouse offer in question is valid as described, and if so (ii) issue a voucher redeemable for the steakhouse credit (e.g., the representative provides a comp slip similar in appearance to a gift certificate). In another embodiment, a casino representative may be located at a particular booth, desk, room or location on casino grounds (e.g., several representatives located at a "Player's Club Booth" use computers to process offer redemption requests, and provide vouchers or benefits).

In other embodiments, a casino representative may directly provide a benefit. For example, if a player desires to redeem a valid "Two free drinks" offer, a representative may accept a cashout receipt (or portion thereof) and either (i) retrieve the drinks, or (ii) using a remote device, transmit a signal (e.g., to a central "food & drink" server) indicating that the drinks should be delivered to a particular location (e.g., to a particular slot machine identified by code or number). In another example, if a player desires to redeem a valid "Free set of Nike™ golf clubs" offer, a representative may accept a cashout receipt (or portion thereof), and process the order (e.g., using a remote device), such that the clubs may be delivered to the patron's home (e.g., the representative enters the patron's name and address, etc.).

Via Kiosk

In some embodiments, a redemption kiosk may provide a benefit. In some embodiments, a kiosk may provide a voucher redeemable for a benefit. For example, a player may insert a cashout receipt and use a touch-sensitive display screen to select a desired offer (e.g. "$20 Buffet credit"). Once it has been determined that the selection is valid, the kiosk may provide a voucher for the selected good/service/establishment. For example, the kiosk may then actuate a ticket printer to print a voucher that may be used to gain $20 in credit at the buffet (or, e.g., a "Buffet Pass for One"); the patron may then present the voucher when paying for a bill, and up to $20 may be deducted from the bill by a buffet cashier, who accepts and stores the voucher accordingly.

In some embodiments, a voucher may comprise a plastic card (e.g., a "gift card" comprising a magnetic stripe, etc.). In another embodiment, a kiosk may enable a player to attain a benefit directly. For example, a player may insert a cashout receipt, and using a mouse and/or keyboard coupled to the kiosk, browse an Internet site to claim an offer. In another example, a kiosk may provide currency to a player via a benefit output device. In yet another example, a player may insert a cashout receipt and redeem a "$30 hotel credit" offer, such that a kiosk may send a signal to a hotel server, authorizing a $30 deduction from the player's hotel bill. In yet another example, a player may use a kiosk to order one or more menu items associated with an offer (e.g., "One steak dinner," "Breakfast in bed," etc.), such that the menu items may be prepared, available and/or reserved when the player arrives at a corresponding establishment. Further still, when redeeming an offer (e.g., a "Free deluxe massage"), a player may use a kiosk to make an electronic reservation at a casino establishment (e.g., a spa, hotel, etc.), such that all the player need do when claiming a benefit at the establishment is present proper identification (e.g., the player arrives at the spa at the reserved time, shows a valid driver's license, and receives a free massage).

Via Gaming Device

In some embodiments, an offer may comprise a benefit redeemable at a gaming device (e.g., free slot machine spins, free loss insurance, a free bonus round entry, a free fixed-price gaming session, additional credits when playing at a later date, etc.). Thus, a gaming device receiving a valid offer selected by a player may enable a benefit associated with the offer.

For example, a player may receive on a first day a cashout receipt providing (i) a $9.50 cashout ticket, and (ii) an offer strip providing a "$12 slot credit tomorrow" offer. The player may then insert the receipt on the following day, and receive a gaming device credit balance of $12 (i.e., the gaming device scans a barcode printed on the cashout receipt, determines a cashout receipt identifier, determines an offer, determines if the offer is valid, and if so, provides a benefit).

It should be noted that as a cashout receipt may be associated with a plurality of offers, a gaming device receiving a cashout receipt may, e.g., access a cashout receipt database to determine if there are any such offers that a player may redeem via the gaming device. For example, offer "OF-000474" is flagged as a "slot machine" offer type. In some embodiments, if more than one offer is a "slot machine" offer, a gaming device may output a message asking a player to choose a particular offer (e.g., "Would you like $12 in credits or an Instant Bonus Round Entry?"). In some embodiments, a gaming device may output a message asking a player to confirm that the patron desires to redeem a particular offer (e.g., "Would you like to receive $12 in credits? Pressing 'Yes' will void all other offers").

In other embodiments, a player may use a gaming device to redeem a benefit that is not related to the gaming device (e.g., the player uses a gaming device to print a voucher or place an order, much like redemption at a kiosk).

Via a Merchant

Various merchants or casino employees (e.g., gift shop clerks, restaurant wait staff, table-game dealers, etc.) may provide benefits associated with a received cashout receipt or offer panel in a variety of manners.

Generally, a merchant may accept a cashout receipt (or component thereof) or a voucher before a transaction is finalized, such that any credit owed to a cashout receipt recipient may be considered before a final amount due is calculated. For example, a casino patron may present a cashout receipt comprising a "Free appetizer" offer when paying for a bill. A clerk may then determine if the offer is valid, and if so, deduct the cost of an appetizer from the bill (as is known in the art). In another example, a patron may present a "$20 steakhouse credit" offer when paying for a bill. If the offer is valid, $20 may be deducted from the bill (as is known in the art). In other embodiments, players may present offers and claim free goods and/or services without paying a bill (e.g., a player arrives at a gift shop, presents a "Free casino hat" offer, and a clerk provides a hat to a player after determining that the offer is valid.

In some embodiments, a kiosk, gaming device, casino representative and/or merchant may provide a credit to a casino patron by crediting an account associated with the patron. A variety of such accounts may be credited in a variety of manners (e.g., comp points are added to a slot club account, money is added to a financial account, etc.).

Via Player Tracking Card

In some embodiments, upon receiving a selection of an offer, a player account associated with a player tracking card may be updated to reflect the offer selection. The same player tracking card may then be used by a player to receive the benefit of the selected offer (e.g., the player arrives at a casino restaurant, provides his player tracking card, and is given his free meal).

Similarly, rather than output a paper sheet, a gaming device or casino may provide a plastic card to be used by a player when receiving cashout receipts. For example, a player may be provided with a $40 Best Buy® gift card, which the player may then take to any Best Buy® location. Alternately, a code or other indicia may be presented to a player via an output device (e.g., display screen, printer), which may then be used to receive the benefit of an offer or an associated cashout amount (e.g., the player later enters the code into an appropriate Web site field).

Unpopular Offer Removed from Pool

In some embodiments, a gaming device or controller may track the acceptance rate of various types of offers (i.e. the number of times the offer is presented divided by the number of times the offer is accepted), such that unpopular offers may be removed from system, and that popular offers may be presented to players with increased frequency.

For example, information stored in a player database (see for example, FIG. 5), including information indicating offers selected by players and offers redeemed by players may be used to determine whether selected offers have been redeemed. Offers accepted in a ratio below a certain threshold may be removed or identified such that the offers may be modified and offered again in the future.

Additional Embodiments

Session or Player Information on Cashout Receipts

In accordance with the disclosed embodiments, cashout receipts may bear indicia representing various information and providing various functionality. Further, any such information can be associated with the receipt in a cashout receipt database, allowing the information to be determined, e.g., by the casino. Any such information may additionally or alternatively be encoded, allowing it to be determined only, e.g., by the casino.

For example, a receipt may represent information generated or stored during the player's gaming session (e.g., outcomes generated). Similarly, receipts may represent information such as an amount won by the player, an amount lost by the player, wager amounts of the player, starting balance, ending balance, difference between starting and ending balances, number of outcomes, time played, time that play started, time that play stopped, the name of the game played, and the like. Such information may be desirable, e.g., for the players tax purposes, to encourage the player.

In some embodiments, a receipt may include (blank or alterable) fields that are to be completed by a player. Such fields may promote the entry and acquisition of desirable information, such as player names, addresses, etc.

We claim:

1. A method of operating a gaming device having an input device, a processor, and a display device, said method comprising:

receiving a wager for a play of a wagering game from a player using the input device;

causing the processor to randomly determine an outcome for the play of the wagering game;

causing the display device to display the randomly determined outcome for the play of the wagering game;

causing the display device to display any awards resulting from the randomly determined outcome for the play of the wagering game;

causing the display device to display a total amount of monetary units the player has on the gaming device after the play of the wagering game;

receiving an input to display a cash-out menu from the player using the input device;

causing the display device to display the cash-out menu in response to said received input, said displayed cash-out menu including:

(a) a displayed indication of a first option to receive a first ticket representative of the total amount of monetary units the player has on the gaming device, and (b) a displayed indication of a second different option to receive:

(i) a second ticket representative of a subsequent additional wagering event which will have a subsequent outcome, said subsequent additional wagering event having a predefined cost, and said subsequent outcome being randomly determined independently from and remotely from the gaming device, and (ii) a third ticket representative of a lesser amount of monetary units than the total amount of monetary units the player has on the gaming device if the total amount of monetary units is greater than the predefined cost;

receiving an input of one of the first option and the second option from the player using the input device; and providing the player the first ticket representative of the total amount of monetary units if the received input is the first option, and if the received input is the second option, providing the player, before the subsequent additional wagering event, (a) the second ticket representative of the subsequent additional wagering, and (b) the third ticket representative of the lesser amount of monetary units if the total amount of monetary units is greater than the predefined cost.

2. The method of operating the gaming device of claim 1, wherein the subsequent wagering event is a game of chance different from the wagering game.

3. The method of operating the gaming device of claim 1, wherein the subsequent wagering event is a keno game.

4. The method of operating the gaming device of claim 1, wherein the subsequent wagering event is a lottery game.

* * * * *

UNITED STATES PATENT AND TRADEMARK OFFICE

CERTIFICATE OF CORRECTION

PATENT NO. : 8,221,223 B2
APPLICATION NO. : 11/465471
DATED : July 17, 2012
INVENTOR(S) : Jay S. Walker et al.

It is certified that error appears in the above-identified patent and that said Letters Patent is hereby corrected as shown below:

IN THE CLAIMS

In Claim 1, Column 52, Line 28, after "wagering" add --event--.

Signed and Sealed this
Twenty-eighth Day of August, 2012

David J. Kappos
*Director of the United States Patent and Trademark Office*